(12) United States Patent
Lee

(10) Patent No.: US 12,654,378 B2
(45) Date of Patent: Jun. 16, 2026

(54) SYSTEM FOR ANALYZING AND MONITORING QUALITY OF INJECTION-MOLDED PRODUCT FOR QUALITY MANAGEMENT OF INJECTION MOLDED PRODUCT

(71) Applicant: EMOLDINO Inc., Seoul (KR)

(72) Inventor: Young-Hwa Lee, Seoul (KR)

(73) Assignee: EMOLDINO INC., Seoul (KR)

( * ) Notice: Subject to any disclaimer, the term of this patent is extended or adjusted under 35 U.S.C. 154(b) by 10 days.

(21) Appl. No.: 18/840,314

(22) PCT Filed: Aug. 10, 2022

(86) PCT No.: PCT/KR2022/011925
§ 371 (c)(1),
(2) Date: Aug. 21, 2024

(87) PCT Pub. No.: WO2023/214618
PCT Pub. Date: Nov. 9, 2023

(65) Prior Publication Data
US 2025/0187241 A1 Jun. 12, 2025

(30) Foreign Application Priority Data
May 2, 2022 (KR) ........................ 10-2022-0054267

(51) Int. Cl.
B29C 45/76 (2006.01)
B29C 45/78 (2006.01)
(Continued)

(52) U.S. Cl.
CPC ............ B29C 45/768 (2013.01); B29C 45/78 (2013.01); B29C 45/80 (2013.01); G01D 5/145 (2013.01);
(Continued)

(58) Field of Classification Search
CPC ....... B29C 45/768; B29C 45/78; B29C 45/80; B29C 2945/7604; B29C 2945/76083;
(Continued)

(56) References Cited

U.S. PATENT DOCUMENTS

2010/0085692 A1* 4/2010 Kim ...................... G06F 1/1643
361/679.01
2017/0246818 A1* 8/2017 Chou ............... B29D 11/00807
(Continued)

FOREIGN PATENT DOCUMENTS

JP 02-042653 B2 9/1990
JP 5551243 B2 7/2014
(Continued)

OTHER PUBLICATIONS

Search Report, mailed Jan. 19, 2024, for International Application No. PCT/KR2022/011925.
(Continued)

*Primary Examiner* — Nahida Sultana
(74) *Attorney, Agent, or Firm* — LRK PATENT LAW FIRM

(57) ABSTRACT

Provided is an injection-molded product quality analysis and monitoring system for injection-molded product quality management, the system having magnetic sensors attachably provided on a movable-side part and a fixed-side part so as to count the number of times molds have opened for injection molding, and managing the quality of products during molding-manufacturing by fixedly providing a temperature sensor at the mold so as to measure the temperature of the mold in real time, and thus measure whether the temperature is maintained within a set range, and fixedly providing an acceleration sensor or a vibration sensor at the mold so as to measure and analyze the amplitude of vibration signals, generated because of the pressure of resin
(Continued)

injected into the mold, and the generation intervals of the vibration signals.

19 Claims, 21 Drawing Sheets

(51) Int. Cl.

| | | |
|---|---|---|
| *B29C 45/80* | (2006.01) | |
| *G01D 5/14* | (2006.01) | |
| *G01H 1/00* | (2006.01) | |
| *G01K 3/00* | (2006.01) | |

(52) U.S. Cl.

CPC ............... *G01H 1/00* (2013.01); *G01K 3/005* (2013.01); *B29C 2945/7604* (2013.01); *B29C 2945/76083* (2013.01); *B29C 2945/76254* (2013.01); *B29C 2945/76387* (2013.01); *B29C 2945/76394* (2013.01); *B29C 2945/76488* (2013.01); *B29C 2945/76949* (2013.01)

(58) Field of Classification Search

CPC ............. B29C 2945/7625; B29C 2945/76387; B29C 2945/76394; B29C 2945/76488; B29C 2945/76949; B29C 2945/7611; B29C 2945/76939; B29C 2945/76943; B29C 2945/76973; B29C 2945/76979; B29C 45/76; B29C 45/84; B29C 45/26; B29C 45/77; B29C 45/7653; B29C 2045/7606; B29C 2945/76066; B29C 2945/76454; B29C 2945/76498; B29C 2945/76551; B29C 2945/76595; B29C 2945/76993; G01D 5/145; G01H 1/00; G01K 3/005; H01F 7/00

See application file for complete search history.

(56) References Cited

U.S. PATENT DOCUMENTS

| | | | | |
|---|---|---|---|---|
| 2019/0342638 A1* | 11/2019 | Samkowiak | ........... | B21D 22/02 |
| 2021/0046673 A1* | 2/2021 | Akamatsu | .............. | B29C 45/84 |

FOREIGN PATENT DOCUMENTS

| | | | |
|---|---|---|---|
| JP | 2018-128876 | A | 8/2018 |
| JP | 2021-024230 | A | 2/2021 |
| KR | 10-1263410 | B1 | 5/2013 |
| KR | 10-1932549 | B1 | 12/2018 |
| KR | 10-2266747 | B1 | 6/2021 |

OTHER PUBLICATIONS

Written Opinion, mailed Jan. 19, 2024, for International Application No. PCT/KR2022/011925.

\* cited by examiner

FIG 9

For Same Back Pressure
Packing Pressure Data A > Packing Pressure Data B
Injection Pressure of Data A > Injection Pressure of Data B

SYSTEM FOR ANALYZING AND MONITORING QUALITY OF INJECTION-MOLDED PRODUCT FOR QUALITY MANAGEMENT OF INJECTION MOLDED PRODUCT

CROSS-REFERENCE TO RELATED APPLICATIONS

The present application is a U.S. National Phase entry from International Application No. PCT/KR2022/011925, filed on Aug. 10, 2022, which claims priority to Korean Patent Application No. 10-2022-0054267, filed on May 2, 2022, the disclosure of which is incorporated by reference herein in their entirety.

TECHNICAL FIELD

The present disclosure relates to a system for analyzing and monitoring the quality of injection-molded products for quality management of the injection-molded products, the system counting the number of injection-molded molds by attaching and installing magnetic sensors to a moving side and a fixed side, the system measuring whether temperature of a mold is maintained within a set range by measuring the temperature in real time by installing a temperature sensor on the mold for management of the quality of a product when manufacturing an injection-molded product, and the system measuring and analyzing in real time the amplitude magnitude and generation interval of vibration signals that are generated by pressure variation of resin that is injected into the mold by fixedly installing an acceleration sensor or a vibration sensor on the mold.

BACKGROUND ART

The related art about quality management of plastic injection-molded products relating to the present disclosure is described.

Recently, business models of the manufacturing industry that were configured and operated in the unit of small-size area in the past have been developed into a global business chain in the unit of large area such as country to country with construction of a global network and globalization of relevant markets.

Accordingly, the relationship between an OEM that is the subject of production and a supplier that is an executor of production have changed into a global relationship from a small-size local relationship, and accordingly, it is limitative to manage a manufacturing chain through the conventional production management method of a spreadsheet type that were managed by recording and input by workers.

In order to solve this problem, the demand for a technology of managing a manufacturing chain by measuring temperature and time during production by applying a sensing device that is mounted on a mold, which is a main manufacturing medium in the manufacturing process, and obtains production information (e.g., a mold counter, a shot counter, an IoT sensing module, an edge sensing module, etc.), etc., has been increased.

However, according to sensing devices to which the related art is applied, another substance (e.g., plastic, air, etc. for a sensing device case) exists between a measuring subject, which measures temperature in the sensing devices, and a mold, so heat transferring from a mold is not fully received and a loss of heat is generated, whereby it is difficult to measure accurate temperature and there is a large difference from the actual temperature of the surface of a mold.

Accordingly, the temperature measurement technology of the related art has a problem that it is impossible to accurately recognize variation of temperature that is generated in the manufacturing and producing process and it is difficult to analyze the quality of manufactured and produced products using temperature variation of a mold.

A configuration that counts the number of operation of a mold using any one or a combination of two or more of a magnet sensor, which is a shot sensor, a temperature sensor, and a shock sensor has been disclosed in Korean Patent No. 10-2266747, but a detailed means or method for quality management of products is not sufficiently described.

Further, a method and a means about how to monitor in detail the quality of products manufactured through a mold is not disclosed in detail.

Japanese Patent Application Publication No. 5551243 (B2) describes that an actuator may have a switch, which is mechanically and/or electrically and/or magnetically operated, for a shot sensor and the switch performs recording and storing after operation of each mold in a molding press, but a detailed means or method for quality management of products is not sufficiently disclosed.

However, a method and a means about how to monitor in detail the quality of products manufactured through a corresponding mold is not disclosed in detail in the prior arts described above.

Japanese Patent Application Publication No. 2018-128876 (A) describes in detail that the number of times of opening of a mold is measured by detecting separation (approach) of a moving side and a fixed by using a detection device such as magnetic sensors disposed in the moving side and the fixed side as shot counters.

However, a method and a means about how to monitor in detail the quality of products manufactured through a mold is not disclosed in detail.

In consideration of the problems in the related art described above, the present disclosure provides a system for analyzing and monitoring the quality of injection-molded products for quality management of the injection-molded products that can analyze the manufacturing process of injection-molded products in real time by detecting the amplitude of a vibration signal, which is generated by temperature variation of a mold and the pressure of resin that is injected into the mold, and the interval of vibration signals that are generated.

DISCLOSURE

Technical Problem

An objective of the present disclosure is to provide a system for analyzing and monitoring the quality of injection-molded products, the system being able to more accurately analyze the quality of injection-molded products using temperature and a vibration signal of a mold that are moved accurately measured because a temperature sensor and an acceleration sensor are fixedly installed on a same printed circuit board by soldering, the printed circuit board having the temperature sensor and the acceleration sensor installed thereon is installed in close contact with a sensor module bottom case made of a metallic material, and the sensor module bottom case having the printed circuit board installed thereon is fixed in close contact with the mold, whereby heat generated from the mold is transmitted to the temperature sensor with a minimum loss of heat and a vibration signal generated from the mold is directly transmitted to the acceleration sensor or a vibration sensor.

Another objective of the present disclosure is to provide a system for analyzing and monitoring the quality of injection-molded products, in which a magnetic sensor counting shots, and a temperature sensor and an acceleration sensor for monitoring the quality of molded products are disposed in a sensor module, and the acceleration sensor may be used as a sensor counting shots and detects an amplitude magnitude of a vibration signal that is generated when resin is injected into a mold and the intervals of vibration signals in real time.

Another objective of the present disclosure is to provide a system for analyzing and monitoring the quality of injection-molded products, the system being able to efficiently save electrical energy that is consumed by a battery disposed in a sensor module by using a sensor counting shots as only a magnetic sensor, by measuring and comparing variation of temperature of a mold measured by the temperature sensor with a set value, and by measuring and comparing variation of the amplitude magnitude of a vibration signal of the mold and the intervals of vibration signals that are measured by the acceleration sensor with a set reference value.

Another objective of the present disclosure is to provide a system for analyzing and monitoring the quality of injection-molded products, the system being able to accurately manage products in better product production by using a magnetic sensor as a shot counter, by using temperature measured by a temperature sensor, and the amplitude magnitude and the intervals of vibration signals measured by an acceleration sensor for quality management, by simultaneously recording and storing obtainment time of each data information when the magnetic sensor, the temperature sensor, and the acceleration sensor detect signal, and by analyzing the signals.

Another objective of the present disclosure is to provide a system for analyzing and monitoring the quality of injection-molded products for quality management of the injection-molded products, the system including a controlled equipped with an MCU and a control algorithm that divides a product production period into a preheating period, a cooling period, producing period, and a non-producing period on the basis of a classification algorithm mounted on a controlling PCB in relation to temperature data of a mold collected by a temperature sensor disposed in a sensor module, and determines products, which are produced in the preheating period, the cooling period, and the non-producing period, as poor products or products with a possibility of a problem.

Another objective of the present disclosure is to provide system for analyzing and monitoring the quality of injection-molded products for quality management of the injection-molded products in which the accuracy of operation is increased by fixedly installing a hall sensor disposed in a sensor module on a side of a controlling PCB equipped with an MCU and a control algorithm and fixedly installing a magnet unit at a moving side of a mold such that the hall sensor and the magnet unit are as close to each other as possible because the magnetic intensity of the magnet unit decreases in inverse proportion to the cube of the distance from the hall sensor.

Technical Solution

An objective of the present disclosure is to implement a system for analyzing and monitoring the quality of injection-molded products, the system counting shots by detecting opening and closing of a mold by fixedly installing a magnetic sensor at sides of a moving side and a fixed side of the mold, and the system monitoring management of injection-molded products by measuring at least one or more of temperature and a vibration signal through at least one or more of a temperature sensor and a sensor that are installed at a side of the mold to measure temperature of the mold and vibration of the mold, respectively.

Another objective of the present disclosure is to implement a system for analyzing and monitoring the quality of injection-molded products in which the magnetic sensor is composed of a magnet unit installed at the moving side of the mold and a hall sensor installed at the fixed side of the mold, the sensor measuring vibration of the mold is an acceleration sensor or a vibration sensor, and the hall sensor, the sensor measuring vibration, and the temperature sensor are disposed in a sensor module.

Another objective of the present disclosure is to implement a system for analyzing and monitoring the quality of injection-molded products in which a sensor module is installed at the fixed side of the mold, a controlling PCB and a measuring PCB are disposed in the sensor module, a hall sensor, a liquid crystal display, an MCU, and a memory equipped with a control algorithm are mounted on the controlling PCB and fixedly installed at an upper portion in a sensor module case, and the measuring PCB is equipped with the temperature sensor and the sensor measuring vibration and is installed in close contact with a sensor module bottom case.

Another objective of the present disclosure is to implement a system for analyzing and monitoring the quality of injection-molded products in which temperature data measured by the temperature sensor installed on the measuring PCB divides a molded product production period into a preheating period, a cooling period, producing period, and a non-producing period on the basis of a classification algorithm of the control algorithm mounted on the controlling PCB, and products produced in the preheating period, the cooling period, and the non-producing period are determined as poor products or molded products with a possibility of a problem and are determined to be excluded from the quantity of good products.

Another objective of the present disclosure is to implement a system for analyzing and monitoring the quality of injection-molded products in which a case in which temperature of the mold changes out of a set normal temperature range occurs also in the producing period, and when temperature departs from the set normal temperature range, a deviation is analyzed through comparison with a reference of data classified as a stable pattern, and when the deviation departs from the set range, products are determined as poor products or products with a possibility of problem, as products produced at abnormal temperature, and are excluded from the quantity of good products.

Another objective of the present disclosure is to implement a system for analyzing and monitoring the quality of injection-molded products in which a vibration signal measured by the acceleration sensor or the vibration sensor at a point in time of end of packing or start of cooling depends on a difference between a magnitude of packing pressure and a magnitude of back pressure, and when an amplitude magnitude of a vibration signal departs from a set magnitude, it is determined that there is a problem with the quality of a molded product.

Another objective of the present disclosure is to implement a system for analyzing and monitoring the quality of injection-molded products in which mold-opening signals and/or mold-closing signals are counted from a vibration signal measured by the acceleration sensor or the vibration sensor, whether a signal interval between the mold-opening signal and the mold-closing signal exists within a set time range is determined by measuring the signal interval in real time, and it is determined that there is a problem with the quality of a molded product when the signal interval is smaller or larger than the set time range as the result of determination.

Another objective of the present disclosure is to implement a system for analyzing and monitoring the quality of injection-molded products in which a time interval is measured in real time for at least one or more of a mold-opening time and a mold-closing time measured by the hall sensor, and it is determined that there is a problem with the quality of a molded product when at least one or more times of the mold-opening time and the mold-closing time depart from a set range of time interval.

Another objective of the present disclosure is to implement a system for analyzing and monitoring the quality of injection-molded products in which a controller is fixedly installed in the sensor module, the controller controls time intervals for obtaining signals from the acceleration sensor or the vibration sensor, the temperature sensor, and the magnetic sensor, a wireless communication unit including Bluetooth is provided to transmit the signals, which are obtained from the hall sensor, the acceleration sensor or the vibration sensor, the temperature sensor, and the magnetic sensor, to at least one or more of a computer, a management server, a server, and a smartphone through a terminal from the controller after data is processed in accordance with a predetermined procedure by an algorithm mounted on the controller disposed in the sensor module, and the signals are transmitted to the whole world in real time through high-speed internet WiFi communication such that managers can manage the quality of molded products.

Another objective of the present disclosure is to implement a system for analyzing and monitoring the quality of injection-molded products in which an AI/ML algorithm that determines what kinds of defects have been generated in real time by labeling various pieces of defect information is constructed, patterns are extracted on the basis of a value regularized or normalized for learning and are learned, and whether it is a good product is determined through comparison with patterns of vibration signal data measured by the acceleration sensor or the vibration sensor on the basis of the learned patterns.

Another objective of the present disclosure is to implement a system for analyzing and monitoring the quality of injection-molded products in which signals are detected separately in periods of start of injection, switch of packing, and end of packing from a vibration signal of the mold to monitor an injection molding process, and a magnitude of an amplitude of vibration signals generated at the points in time of start of injection, switch of packing, and end of packing and at least one or more of times between the periods are continuously measured, and the measured vibration signal data are compared and analyzed with each other, thereby determining whether there is a problem with a molded product.

Another objective of the present disclosure is to implement a system for analyzing and monitoring the quality of injection-molded products in which an AI/ML algorithm that senses a problematic state of a mold or an injection molding machine when a problem is generated in a mold vibration signal pattern is mounted, and patterns of measured vibration signals and learned signal pattern are compared and analyzed when a problem is generated and a poor product is produced while injection-molded products are produced by labeling and learning patterns for problems generated in various ways in a mold or an injection molding machine, and a molding condition is changed such that at least one or more of increasing or decreasing an injection speed, increasing or decreasing the magnitude of packing pressure, and increasing or decreasing a packing time are performed to progress to a normal control process so that good products are produced in a process in which poor products are produced.

Another objective of the present disclosure is to implement a system for analyzing and monitoring the quality of injection-molded products in which an AI/ML algorithm that senses a problematic state of a mold or an injection molding machine is mounted, and a point in time for maintenance of the mold or the injection molding machine or problems that may be generated are determined by labeling for problems that are generated in various ways in the mold or the injection molding machine, and by comparing the labeled and learned patterns on the basis of variation patterns of vibration signal data measured and collected in real time by the acceleration sensor or the vibration sensor when a problem is generated in a vibration signal pattern.

Another objective of the present disclosure is to implement a system for analyzing and monitoring the quality of injection-molded products in which intensity of magnetism of a magnet installed in the magnet unit decreases in inverse proportion to a cube of a distance, so the magnet unit and the sensor module having the hall sensor therein are fixedly installed within a set distance, it is disposed on the controlling PCB and fixedly installed at an upper portion in the sensor module, and the magnet installed in the magnet unit is fixedly installed at an upper portion of the magnet unit at a predetermined distance from a mold surface due to a property that magnetic flux density decreases at high temperature.

Another objective of the present disclosure is to implement a system for analyzing and monitoring the quality of injection-molded products in which a battery for supplying electrical energy to electronic parts disposed in the sensor module is fixedly installed on a battery-fixing member positioned between the measuring PCB and the controlling PCB, a silicon member for fixing the battery is fixedly installed over the battery such that the battery is not separated from the battery-fixing member, and an insulating plate is fixedly installed under the battery-fixing member to prevent a use temperature limit of the battery from being exceeded by minimizing heat transferring to the battery.

Advantageous Effects

The present disclosure has an improved effect that it is possible to increase efficiency and reliability in product quality management by disposing and installing a temperature sensor and an acceleration sensor on a same printed circuit board, installing the printed circuit board having the temperature sensor and the acceleration sensor installed thereon in close contact with a sensor module bottom case made of a metallic material, and fixing a mold in close contact with the sensor module bottom case having the printed circuit board installed thereon such that heat and vibration generated by the mold are maximally quickly and accurately transmitted to the temperature sensor and the acceleration sensor and the temperature and vibration signal of the mold are measured in real time.

The present disclosure has another effect that timely process management is possible and accordingly productivity of good products is improved because the temperature of a mold is measured at a same or similar level through a sensing device, it is possible to accurately recognize and analyze temperature variation of the mold that is generated during manufacturing and producing, and it is possible to distinguish good products and products with a defect or a possibility of a problem by analyzing in real time patterns of products, which are manufactured and produced, according to temperature variation of the mold on the basis of the recognition and analysis.

The present disclosure has another effect that reliability and accuracy in management are increased by performing quality management of products through double or triple steps by counting the number of times of mold-opening through a magnetic sensor, and by detecting in real time temperature variation of a mold and variation of the amplitude magnitude and the time interval of vibration signals, which are generated when resin is injected, by disposing a temperature sensor and an acceleration sensor for monitoring the quality of products by detecting the temperature of the mold, and the amplitude magnitude and time interval of vibration signals.

The present disclosure has another improved effect that it is possible to quickly and accurately receive actual information of a mold and to minimize distortion and attenuation of a vibration signal by designing and manufacturing a transmission medium between a sensor and a mold surface, using a metallic material the same as the mold, and by firmly fastening them using a bolt.

The present disclosure has another improved effect of increasing accuracy and reliability in monitoring of the quality of injection-molded products by using an algorithm, which obtains data at a point in time at which amplitude variation over a set magnitude is generated over time from a vibration signal sensed by an acceleration signal disposed in a sensor module and measures time between points in time of 'start of injection', 'switch of packing', and 'end of packing', and by calculating and applying variation of the amplitude magnitude and the time interval of measured vibration signals as information for monitoring the quality of injection-molded products.

The present disclosure has another improved effect that it is possible to increase accuracy in operation of counting the number of times of shots by fixedly installing a hall sensor disposed in a sensor module at a side of a controlling PCB equipped with a control algorithm and by installing a magnet unit and a hall sensor as close to each other as possible at a predetermined distance from a mold surface because the magnitude of the magnetism of the magnet unit fixedly installed at a moving side of the mold decreases in inverse proportion to the tube of the distance from the hall sensor and the magnetic flux density decreases at high temperature.

BRIEF DESCRIPTION OF DRAWINGS

FIG. 9 is a conceptual view showing the case in which mold temperature variation is generated in a producing period 803 of FIG. 6.

BEST MODE

The present disclosure implements a system for analyzing and monitoring the quality of injection-molded products, the system counting shots by detecting opening and closing of a mold by fixedly installing a magnetic sensor at sides of a moving side and a fixed side of the mold, and the system monitoring management of injection-molded products by measuring at least one or more of temperature and a vibration signal through at least one or more of a temperature sensor and a sensor that are installed at a side of the mold to measure temperature of the mold and vibration of the mold, respectively.

MODE FOR INVENTION

Details for implementing the present disclosure are described.

The present disclosure includes a sensing device composed of a magnet unit and a sensor module fixedly installed on a mold to obtain molded product production information, in which the sensor module is composed of a hall sensor that counts the number of times of mold-opening and a measuring Printed Circuit Board (PCB) to which a temperature sensor and an acceleration sensor for quality management of products are fixedly installed.

The hall sensor is fixedly installed on a controlling PCB in which a Microcontroller Unit and a memory equipped with a control algorithm are disposed and converts a signal measured in accordance with a predetermined procedure by the MCU and the control algorithm mounted on the memory into data for analysis, and then the processed data is transmitted to a management server, a server, a cloud server, etc. through a terminal through Bluetooth communication, etc.

That is, it is possible to transmit data to the whole world through high-speed internet WiFi communication so that managers who manage the quality of molded products can easily access the date for management.

The sensor module is fixedly installed at a fixing side of a mold and the magnet unit is fixedly installed at a moving side at a predetermined distance from the sensor module and is configured to count the number of times of mold-opening.

A detailed embodiment of the present disclosure is described.

Embodiment

A detailed embodiment of the present disclosure is described on the basis of drawings.

Disposition and functions of components constituting the sensing device of the present disclosure are described.

Figure 1:
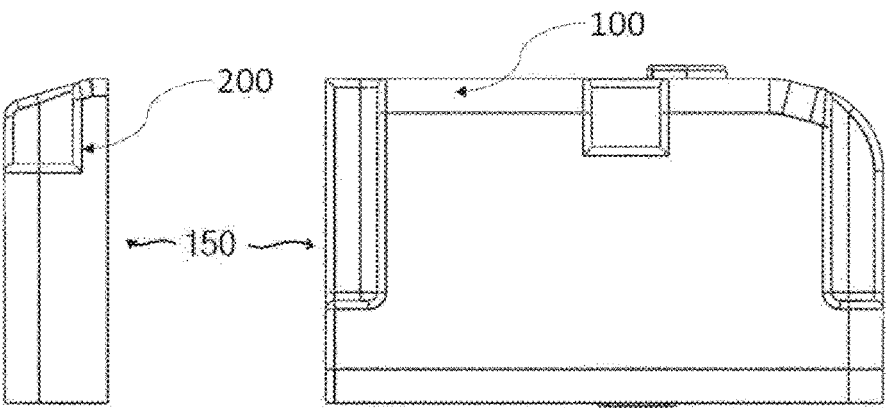
FIG. 1 shows one embodiment of a sensing device composed of a sensor module and a magnet unit.

FIG. 1 shows one embodiment of a sensing device composed of a sensor module and a magnet unit.

As in FIG. 1, a 'sensing module' in the specification of the present disclosure is composed of a 'magnet unit' and a 'sensor module' and the sensor module accommodates a hall sensor, a temperature sensor, an acceleration sensor, a battery, a measuring PCB, a controlling PCB, etc.

Figure 2:
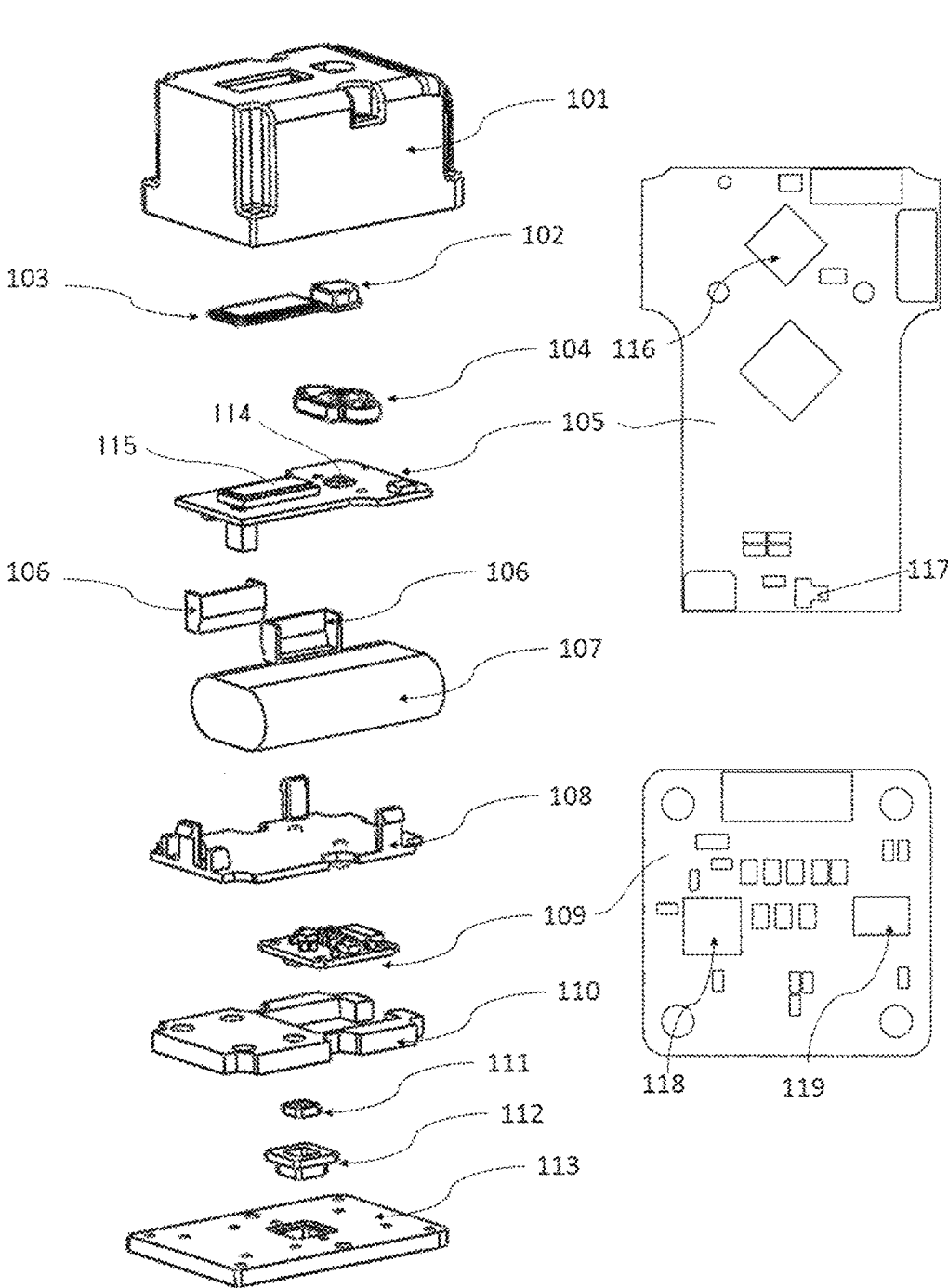
FIG. 2 is an exploded view showing the internal structure of the sensor module 100 of FIG. 1.

FIG. 2 is an exploded view showing the internal components of the sensor module (100 in FIG. 1) of the sensing device (150 in FIG. 1) of FIG. 1.

Components that are described in the description of reference numerals in the specification of the present disclosure but are not stated in detail are expressed such that it is possible to easily know what functions corresponding configurations have in comparison to the matters described in description of reference numerals, so they are not described in detail.

Figure 3:
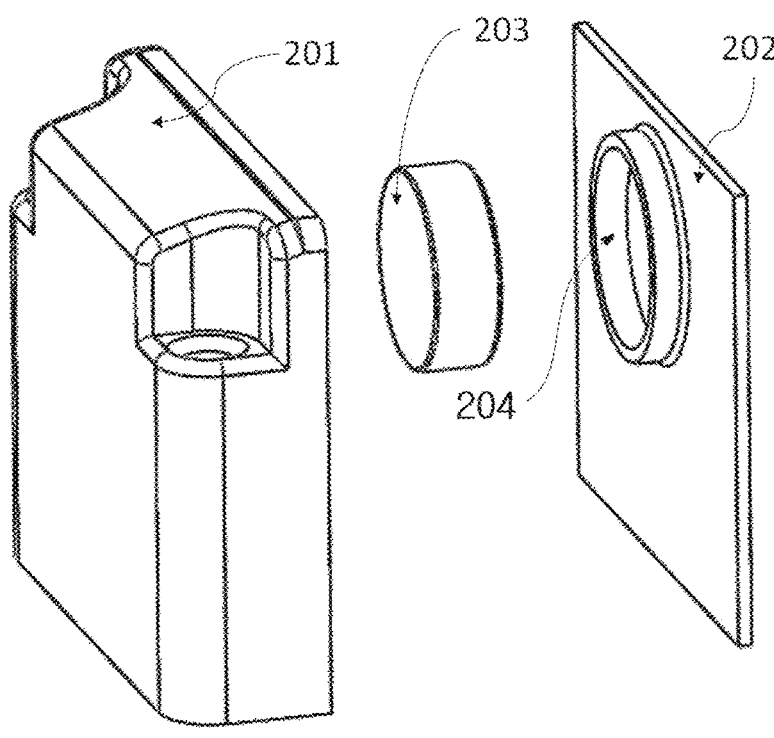
FIG. 3 is an exploded view of the magnet unit 200 of FIG. 1.

FIG. 3 is an exploded view of the magnet unit 200 of FIG. 1.

The magnet unit is composed of a magnet body (201 in FIG. 3), a magnet unit cover (202 in FIG. 3), and a magnet (203 in FIG. 3), and it is preferable that the magnet is made of neodymium of which the intensity of magnetism is strong.

In more detail, the configuration of the sensor module (100 in FIG. 1) is described.

The present disclosure includes a sensing device (150 in FIG. 1) composed of a magnet unit (200 in FIG. 1) and a sensor module (100 in FIG. 1) to obtain molded product production information by being mounted on a mold.

A temperature sensor, an acceleration sensor, a hall sensor, a measuring PCB to which the temperature sensor and the acceleration sensor are fixedly installed, a battery (107 in FIG. 2), a controlling PCB on which an MCU and a memory equipped with a control algorithm are disposed, etc. are disposed in the sensor module (100 in FIG. 1) described in the specification of the present disclosure.

The temperature sensor (119 in FIG. 2) and the acceleration sensor (118 in FIG. 2) of the sensor module (100 in FIG. 1) are fixedly installed on the measuring PCB (109 in FIG. 2) and fixedly installed on a sensor module bottom case (113 in FIG. 2), and the sensor module bottom case (113 in FIG. 2) is firmly fixedly installed in contact with a mold.

The sensor module (100 in FIG. 1) according to the present disclosure uses the magnetic sensor to count the number of times of mold-opening and can detect a temperature and/or vibration signal detected by the temperature sensor and the acceleration sensor, and can monitor and control the temperature and/or vibration signal for quality management of a molded product in real time through a control algorithm and a program developed in accordance with the present disclosure.

The magnetic sensor is composed of a magnet and a hall sensor and it is preferable that the magnet unit in which a permanent magnet is disposed is fixedly installed at a moving side of a mold and the hall sensor disposed in the sensor module is fixedly installed at a fixed side of the mold.

It is preferable to use the magnet sensor as a sensor for counting the number of tome of mold-opening in consideration of the power consumption of a battery, but an optical sensor, etc. may be used, if necessary.

In FIG. 2, it is preferable that the hall sensor disposed in the sensor module (100 in FIG. 1) is fixedly installed at a side of the controlling PCB, but the hall sensor may be separated or fixedly installed at another position in consideration of the distance between the internal accommodation space and the magnet.

Since the intensity of the magnetism of the magnet (200 in FIG. 1) decreases in inverse proportion to the cube of the distance in the magnetic sensor, the distance between the magnet unit and the hau sensor is important, and accurate operation is possible only when the distance between the magnet unit and the hall sensor is maintained at a predetermined distance.

The intensity of the magnetism of the magnet (e.g., neodymium) of the magnet unit decreases at when temperature increases due to reduction of magnetic flux density, so it is preferable to fixedly install the magnet slightly far from the surface of a mold.

Figure 8:
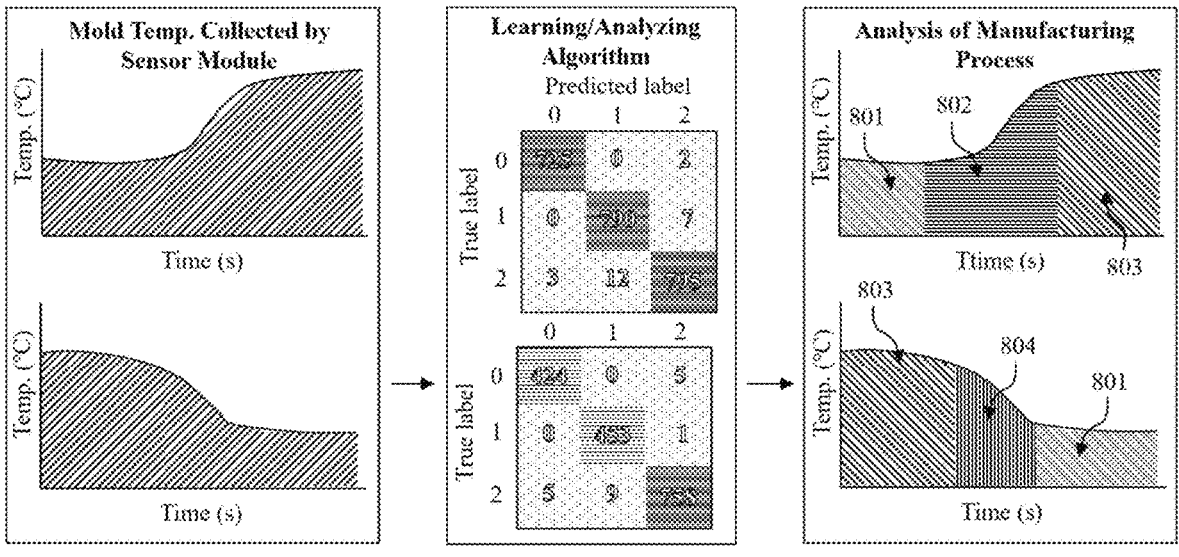
FIG. 8 is a conceptual view showing the period of a molded product production process divided through pattern analysis of a measured temperature of a mold.

Referring to FIG. 8 in relation to this, the temperature of a mold surface is not higher than 60° C. and is fortunately temperature that may not be greatly concerned.

FIG. 3 is an exploded view of the magnet unit, in which the magnet unit is composed of a magnet body (201 in FIG. 3), a magnet unit cover (202 in FIG. 3), and a magnet (203 in FIG. 3), and it is preferable that the magnet is made of neodymium.

In FIG. 3, it is preferable to couple and assemble the magnet unit by coupling the magnet to the magnet unit body (201 in FIG. 3) by inserting the magnet into a magnet accommodation groove (204 in FIG. 3) formed at a middle upper portion of the magnet unit cover (202 in FIG. 3), and it is preferable to dispose the position of the hall sensor (117 in FIG. 2), which is fixedly installed in the sensor module, also in consideration of the position of the magnet.

That is, it is preferable to fix and install the magnet at a predetermined distance from a mold surface when designing and manufacturing the magnet unit (200 in FIG. 1) in consideration of the fact that the intensity of the magnetism of the magnet decrease in inverse proportion to the cube of a distance and the magnetic flux density decreases at high temperature.

The magnetic sensor is usually used as a shot count that counts the number of times of mold-opening, but may be used to determine that there is a problem with the quality of a molded product when the interval and/or cycle between a shot and a shot measured by a clock disposed in the sensor module is shorter than a set time.

It is possible to record and store in real time the measurement time of signals measured by sensors by disposing a clock at a side of the controlling PCB in the sensor module.

Data measured by the magnet and the hall sensor of the sensor module can also be used as means for evaluating a molding quality.

In the terms 'signal' and 'data' stated the specification, the 'signal' is usually used to refer to a signal measured from a mold by a sensor and the 'data' is usually used from after the point in time at which a measured signal is transmitted to a controlling PCB and processed by a control program.

Those skilled in the art would easily understand these terms.

The sizes and shapes of the magnet unit (200 in FIG. 1) and/or the sensor module (100 in FIG. 1) shown in FIG. 1 and FIG. 2 are examples according to the present disclosure, and they may be modified, designed, and manufactured in various ways in consideration of the disposition of the accommodated parts, the sizes of the measuring PCB and the controlling PCB, etc.

As another one embodiment of the present disclosure, it is possible to quickly and accurately measure the temperature of a mold surface by minimizing a loss of heat transfer between the mold surface and the temperature sensor in the sensor module (100 in FIG. 1) by manufacturing the sensor module bottom case 113 using a metallic material the same as or similar to the surface of the mold to be measured.

Further, on the basis of this configuration, it is possible to more accurately analyze the quality of a product that is manufactured through molding on the basis of temperature measured through the sensor module (100 in FIG. 1) fixedly installed on a mold.

Figure 4:
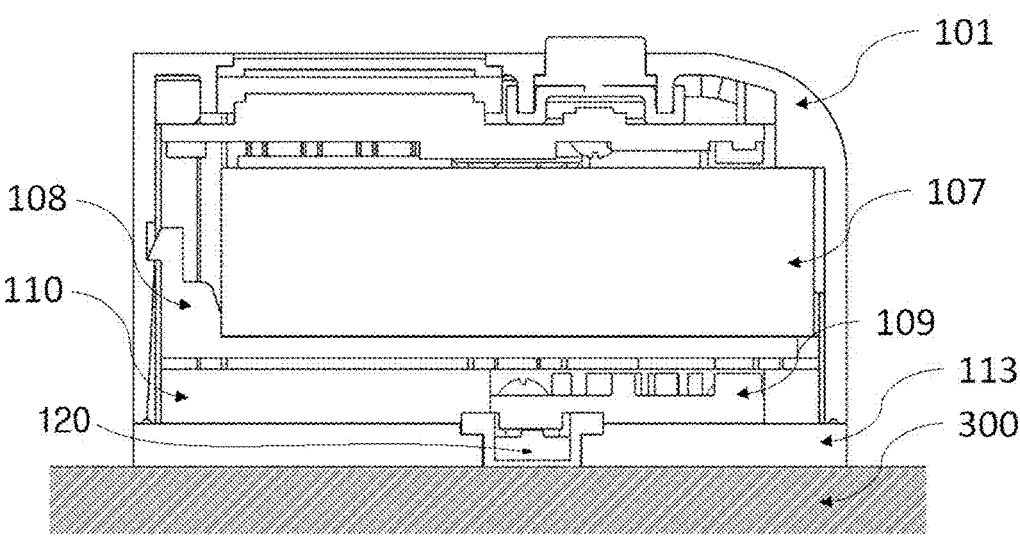
FIG. 4 is a cross-sectional view showing the state in which a sensor module is mounted on the surface of a mold 300.

As another embodiment of the present disclosure, as in FIG. 4, the temperature sensor and the acceleration sensor are fixedly installed on the measuring PCB (109 in FIG. 4) and are fixed on the sensor module bottom case (111 in FIG. 4) and it is preferable that the sensor module bottom case (111 in FIG. 4) is firmly fixedly installed in direct contact with a mold.

In the configuration in which a mold surface and the sensor module bottom case 113 are in direct contact or substantially in direct contact with each other, there is an improved effect that the temperature of a mold measured by the temperature sensor (119 in FIG. 2) and vibration signals measured by the acceleration sensor (118 in FIG. 2) can be detected as temperature and vibrations signal that are almost the same as surface temperature of the mold and vibration signals of the mold.

As shown in FIG. 2, the sensor module for quality management of a molded product is composed of a sensor module bottom case 113 for transmitting heat of a mold surface to a temperature measurement medium without a loss, a measuring PCB (109 in FIG. 2) on which a temperature sensor for measuring temperature and an acceleration sensor or a vibration sensor for detecting a vibration signal are mounted, a controlling PCB 105 equipped with an MCU and a control algorithm to process measured information, and a sensor module top case 101.

As described above it is preferable that the controlling PCB (105 in FIG. 2) on which the hall sensor considering the position of the magnet, an operation button (102 in FIG. 2), and a liquid crystal display (115 in FIG. 2) are fixedly installed is fixedly installed at an upper portion in a sensor module case, as in FIG. 4, and the temperature sensor (119 in FIG. 2) measuring temperature and/or the acceleration sensor (118 in FIG. 2) measuring a vibration signal are fixedly installed on the measuring PCB (109 in FIG. 2) and fixedly installed on the sensor module bottom case 113.

The liquid crystal display (115 in FIG. 2) displays information to be displayed using alphabets, numbers, special characters, etc., and can display the final number of shots (accumulated count), a mold-closed state, a battery level, communication sensitivity between a terminal and a controller, an installation state, whether there is stored data, etc.

The liquid crystal display (115 in FIG. 2) is an abbreviated name and is also referred to as a 'liquid crystal display for displaying information' and a 'liquid crystal display for displaying sensor module information, and all of which have the same meaning.

It is preferable to fixedly install the temperature sensor (119 in FIG. 2) and the acceleration sensor (118 in FIG. 2) on the same measuring PCB (109 in FIG. 2), as in FIG. 2, in order to reduce an installation space and easily assemble them, but they may be separately manufactured.

A signal and temperature measured by the hall sensor, the temperature sensor, and/or the acceleration sensor undergo a predetermined data processing procedure in the controller by executing a predetermined program at the MCU and the memory equipped with a control algorithm, and then can be transmitted to a terminal through various communication means such as Bluetooth communication in the sensor module.

In FIG. 4, the sensor module bottom case 113, the measuring PCB 109, and the mold 300 are disposed, as in FIG. 4, whereby the sensor module is fixedly installed on the mold in a contact type of them.

The sensor module bottom case 113 and the mold 300 are installed in direct contact with each other and they are firmly fixedly installed using a bolt or a magnet such that the contact surfaces are continuously firmly maintained.

Further, the sensor module bottom case 113 and the measuring PCB 109 are also fixedly installed in direct contact with each other and it is preferable to firmly fixedly install them using a common fastener such as a bolt such that the contact surfaces can be continuously maintained.

Since common molds are made of metallic materials having high temperature conductivity, it is preferable that the sensor module bottom case 113 is also made of the same metallic material as the mold, but the sensor module bottom case 113 may be made of a metallic material having thermal conductivity higher than the material of the mold.

Accordingly, since the sensor module bottom case (113 in FIG. 2) has thermal conductivity similar to or the same as the mold, it can receive heat from the mold with a minimized loss of heat and it is possible to measure temperature similar to or the same as the mold.

In FIG. 4, a button (120 in FIG. 4) for checking installation of the sensor module is installed at a side of the sensor module bottom case toward the mold surface to show that the sensor module is installed on the mold surface.

The button (120 in FIG. 4) for checking installation of the sensor module serves to transmit a signal to the controller when the sensor module is separated from the mold surface and the signal is transmitted to various wireless communication means including internet WiFi through a terminal such that a manager can check it.

Figure 5:
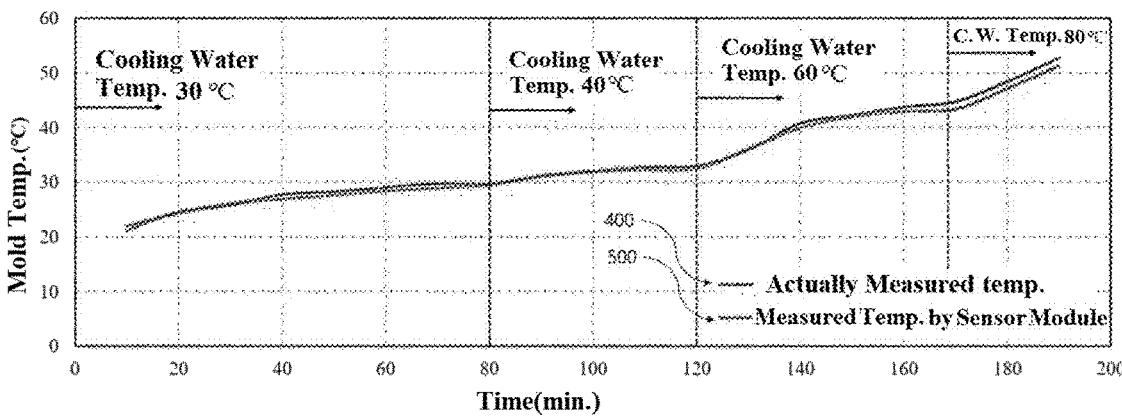
FIG. 5 compares measured temperature of a sensing device to which a mold temperature measurement method of the present disclosure is applied and an actual surface temperature of a mold.

As in FIG. 4, heat of a mold surface transfers to the measuring PCB 109 being in direct contact with the sensor module bottom case (111 in FIG. 4), and the temperature sensor (119 in FIG. 2) in the measuring PCB 109 measures temperature. In this case, temperature similar to or the same as the temperature of the mold surface is measured, as in FIG. 5.

Since the acceleration sensor fixedly installed on the measuring PCB 109 is also fixedly installed on the sensor module bottom case (113 in FIG. 2), it can receive a vibration signal in each process step with a minimum loss of a vibration signal that is transmitted from the mold when a reduction ratio is similar to or lower than the mold, so there is an improved effect that it is possible to accurately distinguish and measure variation of vibration signals in the steps, respectively.

Figure 10:
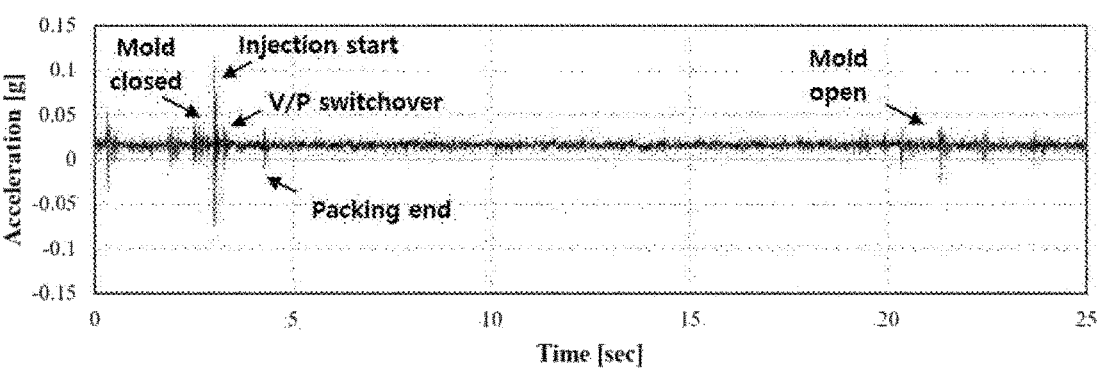
FIG. 10 is a view showing a vibration signal of a mold measured by an acceleration sensor disposed in a sensor module.

FIG. 10 is a view showing a vibration signal of a mold measured by an acceleration sensor disposed in a sensor module.

Figure 11:
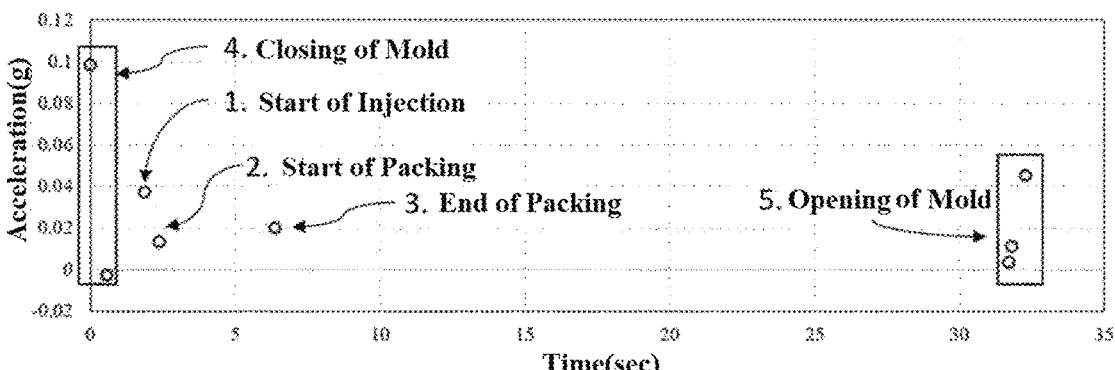
FIG. 11 is a view showing different process steps in accordance with a recording point in time of vibration signal data in which an amplitude magnitude value of a vibration signal measured by an acceleration sensor shows the characteristic of each process step of a producing process.

As in FIG. 11, a vibration signal of a mold is transmitted to the measuring PCB 109 being in direct contact with the sensor module bottom case (113 in FIG. 2) and the acceleration sensor (118 in FIG. 2) in the measuring PCB (109 in FIG. 2) can measure the vibration signal transmitted from the mold, like the signal shown in FIG. 11.

Figure 12:
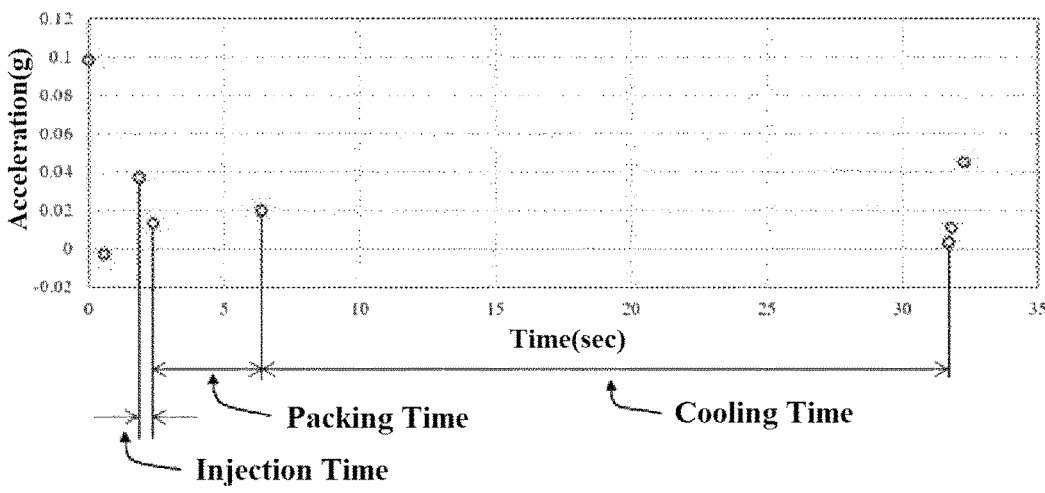
FIG. 12 is a view analyzing and showing necessary time of each process step on the basis of a collected vibration signal.

In this case, as in FIG. 12, variation of vibration generated in each step of the process is measured as a vibration signal through the acceleration sensor (118 in FIG. 2) in the sensor module and specific peak values are extracted by the algorithm mounted on the controlling PCB 105 in the sensor module and arranged and stored in a data array.

The controlling PCB (105 in FIG. 2) in the sensor module is fixedly installed at the upper portion in the sensor module to maintain a predetermined gap (distance) from a high-temperature mold surface, thereby being able to increase the durability of parts fixed on the controlling PCB on which the hall sensor is installed and to increase accuracy of the operation of the magnetic sensor by decreasing and maintaining the distance between the magnet and the hall sensor.

Figure 6:
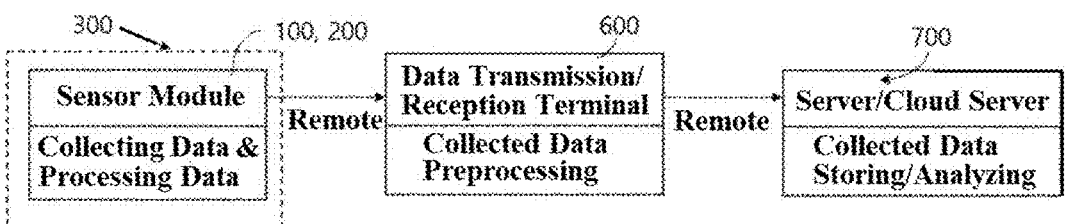
FIG. 6 is a flowchart showing a process in which temperature data measured by a sensing device is transmitted to a server and/or a cloud server 700 through a data transmission/reception terminal 600.

The acceleration sensor in the sensor module mounted on a mold may be configured as a system that collects vibration signals of the mold through the measuring PCB (109 in FIG. 2), as in FIG. 10, at predetermined time intervals or in real time by executing the control program mounted on the controlling PCB (105 in FIG. 2), converts measured signals into specific peak values of the vibration signals measured in process steps, respectively, and transmits data to a server or a cloud server (700 in FIG. 6) through a data transmission/reception terminal (600 in FIG. 6) shown in FIG. 6.

The peak value of a vibration signal means a peak value of a signal shown in closing of a mold, opening of a mold, start of injection, start of packing, and end of packing in the amplitude magnitude of a vibration signal (FIG. 10) measured by an acceleration sensor.

The controlling PCB (105 in FIG. 2) described in the specification of the present disclosure is equipped with a control program designed and made in accordance with the present disclosure and controls the sensing device by executing the mounted control program through an MCU, so it can be referred to as a 'controller'.

It is preferable that the controlling PCB (105 in FIG. 2) is equipped with program firmware for operating the MCU and the sensing device and is preferably configured to make data collected by the measuring PCB (109 in FIG. 2) into one data array through a firmware algorithm and to make data be transmitted and received from a controller to a terminal through wireless communication such as Bluetooth.

The controlling PCB (105 in FIG. 2) and the measuring PCB (109 in FIG. 2) are connected through a flexible cable to transmit and receive signals (information).

A management server, a server, or an Amazon cloud server (700 in FIG. 6) records and stores data transmitted from the controller of the sensing device through a terminal into a memory and/or a database.

Figure 7:
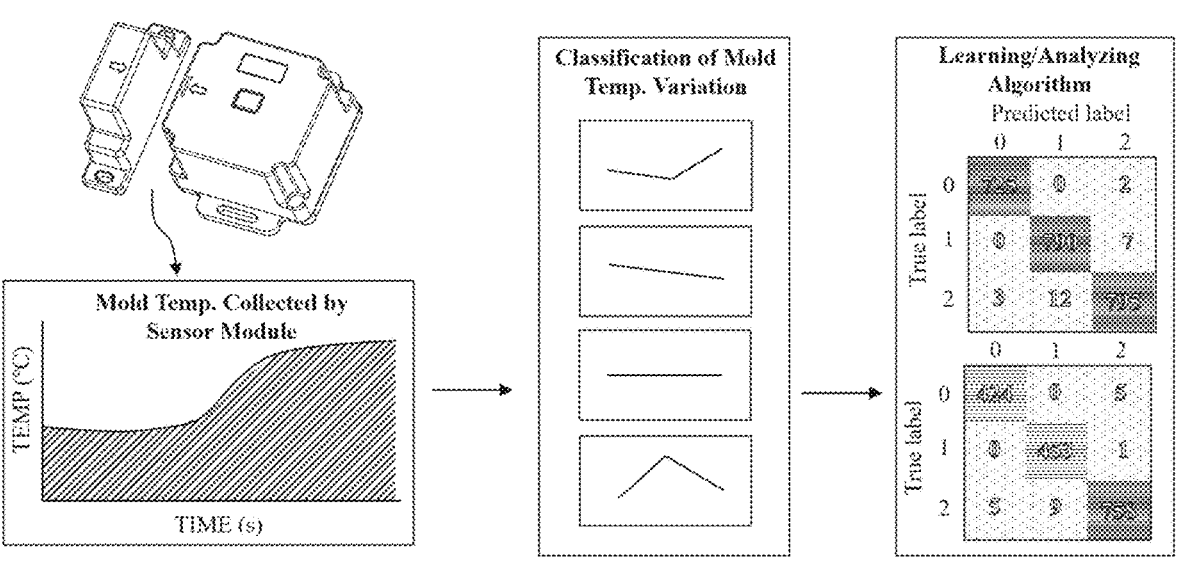
FIG. 7 is a conceptual view showing a type and a method of pattern analysis of mold temperature data measured through a sensing device.

In FIG. 8, a measured temperature is classified into patterns 801, 802, 803, and 804 such as an increase, reduction, stability, fluctuation in accordance with variation, and learning and analyzing are performed, as in FIG. 7, using a mathematical statistic tool/algorithm and/or an AI/ML algorithm.

In accordance with collected temperature data, a molded product production period is divided into a preheating period 802, a cooling period 804, a producing period 803, and a non-producing period 801, as in FIG. 8, on the basis of a classification algorithm mounted on the controlling PCB.

In FIG. 8, molded products that are produced in the preheating period 802, the cooling period 804, and the non-producing period 801 are determined as poor products or molded products with a possibility of a problem and can be excluded from the quantity of good products.

Figure 9:
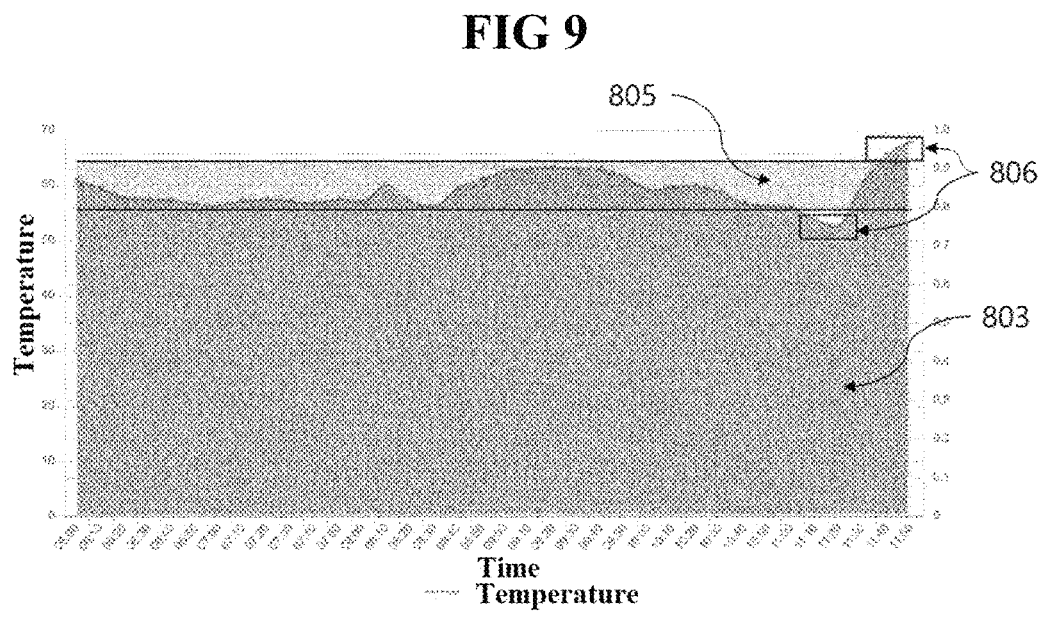

A case in which the temperature of a mold changes out of a set normal temperature (806 in FIG. 8), as in FIG. 9, occurs also in the producing period (803 in FIG. 8) of FIG. 8, and in this case, when data departs from a set range by analyzing deviations through comparison with the reference of data classified as a stable pattern (805 in FIG. 8), and products are classified as products produced at abnormal temperature are determined as poor products or products with a possibility of a problem and excluded from the quantity of good products.

The magnitude value of a vibration signal measured by an acceleration sensor recorded in FIG. 11 shows the characteristic of each process step of a producing process and shows different process steps in accordance with a recording point in time of data.

FIG. 12 is a view showing a necessary time of each process step according to the measurement time of the amplitude magnitude of a vibration signal measured by the acceleration sensor of FIG. 11.

In FIG. 11, the magnitude of the signal at the point in time of start of injection of No. 1 is changed in accordance with an injection speed set in the process, and as the injection speed is increased, the force for driving the molding machine and the shock that is generated when a material is injected into a mold are increased, so the amplitude magnitude of a vibration signal is increased.

In FIG. 11, the signal at the point in time of start of packing or switch of packing of No. 2 depends on the difference between the magnitudes of injection pressure and packing pressure, and the larger the difference of the magnitudes, the larger the amplitude magnitude of a vibration signal.

The point in time of start of packing or switch of packing is a process of forcibly controlling pressure from injection pressure to packing pressure, and the larger the pressure difference, the larger the amplitude magnitude of a vibration signal.

In FIG. 11, the signal at the point in time of end of packing or start of cooling of No. 3 depends on the difference between the magnitude of packing pressure and the magnitude of back pressure, and the larger the difference of the magnitudes of pressure, the larger the amplitude magnitude of a vibration signal.

The point in time of end of packing or start of cooling is a point in time at which the process to which packing pressure is applied and back pressure for filling a machine with a material for the next production acts.

In this case, pressure is controlled from the packing pressure to the back pressure, and the larger the difference of the pressure, the larger the magnitude of the amplitude of a vibration signal.

A vibration signal measured at the point in time of end of packing or start of cooling in a molding process depends on the difference of the magnitude of packing pressure and the magnitude of back pressure, and when the amplitude magnitude of a vibration signal departs from a set magnitude, it is possible to determine that there is a problem with the quality of the molded product.

No. 4 and No. 5 in FIG. 11 show vibration signals measured due to operation of opening and closing of a mold, in which No. 4 shows the amplitude magnitude of a vibration signal generated when a mold is closed (mold-closing) and No. 5 shows the amplitude magnitude of a vibration signal generated when a mold is opened (mold-opening).

On the basis of this, it is possible to count the number of shots by counting mold-opening signals and mold-closing signals from a vibration signal measured by an acceleration sensor, and it is also possible to evaluate the quality of a molded product due to a difference in injection speed by measuring and comparing the signal intervals between a mold-opening signal and a mold-closing signal in real time.

Figure 13:
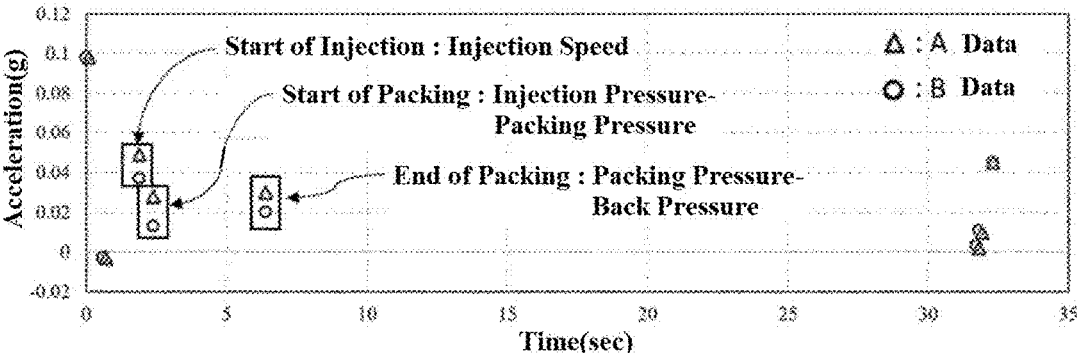
FIG. 13 shows an AI/ML algorithm that learns whether it is a pattern that enables production of good products or whether it is a production pattern with a possibility of a defect or a problem by distinguishing distribution of amplitude magnitude data of vibration signals measured by an acceleration sensor.

As in FIG. 13, it is possible to analyze a pressure variation level in a molding process, and when variation of pressure departs from a set range, it is possible to determine that there is a problem with the quality of the molded product.

In general, back pressure that is applied to fill a molding machine with a material for the next production is determined on the kind of the material that is used.

An appropriate level of back pressure is determined in accordance with the kind of a material such as polypropylene and polycarbonate. Further, back pressure can be considered as a fixed condition value unless the material is changed to a new kind of material.

Accordingly, when it is determined that back pressure is a fixed value, the acceleration magnitude at the point in time of end of packing of the data A in FIG. 13 is large than the magnitude of the data B, so it can be seen that the packing pressure of the data A is larger than B.

Further, the acceleration magnitude at the point in time of start of packing of the data A in FIG. 13 is also larger than the data B, and in this case, it can be seen that the injection pressure of the data A is larger than the injection pressure of the data B in connection with data analysis at the point in time of end of packing described above.

Accordingly, it is possible to find out pressure variation in each process step in an injection molding process by analyzing the amplitude magnitude value of a vibration signal measured through the sensor module.

The time difference between the points in time of start of injection and start of packing means an injection time as the necessary time of the injection step, and the time difference between the points in time of start of packing and end of packing means a packing time that is the necessary time of the packing step.

The time difference between the point in time of end of packing and the mold-opening point in time at which a mold is opened means a cooling time as a necessary time of the cooling step.

Data transmitted to a management server, a server, or a cloud server and recorded and stored in the memory is classified into product production of good products and product production of poor products or products with a possibility of problem through a statistical algorithm and/or an AI/ML algorithm, and it is possible to analyze productivity and the defect rate on the basis of the classification.

The statistical algorithm and/or the AI/ML algorithm can be mounted on a management server, a server, a cloud server, a computer, etc. that execute a program while recording and storing in real time vibration signal data measured by an acceleration sensor or a vibration sensor and can manage production or predict a point in time for maintenance of a mold and/or an injection molding machine by analyzing the quality of various molded products on the basis of the data recorded and stored in the memory.

Figure 14:
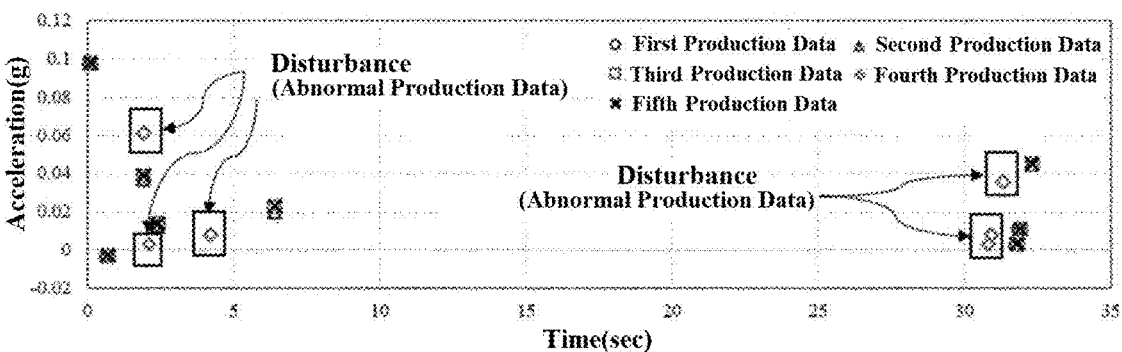
FIG. 14 shows a process of analyzing vibration signal data measured by an acceleration sensor or a vibration sensor through a statistical algorithm.
Figure 15:
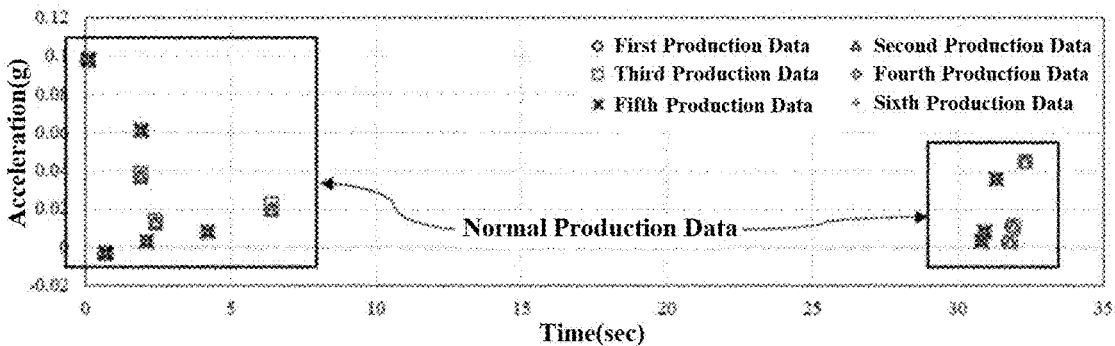
FIG. 15 shows a process of analyzing a vibration signal data as normal data when a predetermined value is continuously maintained after variation of the vibration signal data is generated as in FIG. 14.

FIG. 14 shows a process of analyzing vibration signal data measured by an acceleration sensor or a vibration sensor through a statistical algorithm.

When a disturbance of vibration signal data is generated, it is possible to determine this as production with a possibility of a defect or a problem and distinguish this from production of good products on the basis of the amplitude magnitude of vibration signals measured, recorded, and stored before and the time analysis data.

However, when a predetermined value is continuously maintained after variation of collected vibration signal is generated, production is not classified into a defect or a possibility of a problem and is considered as normal product production.

Figure 16:
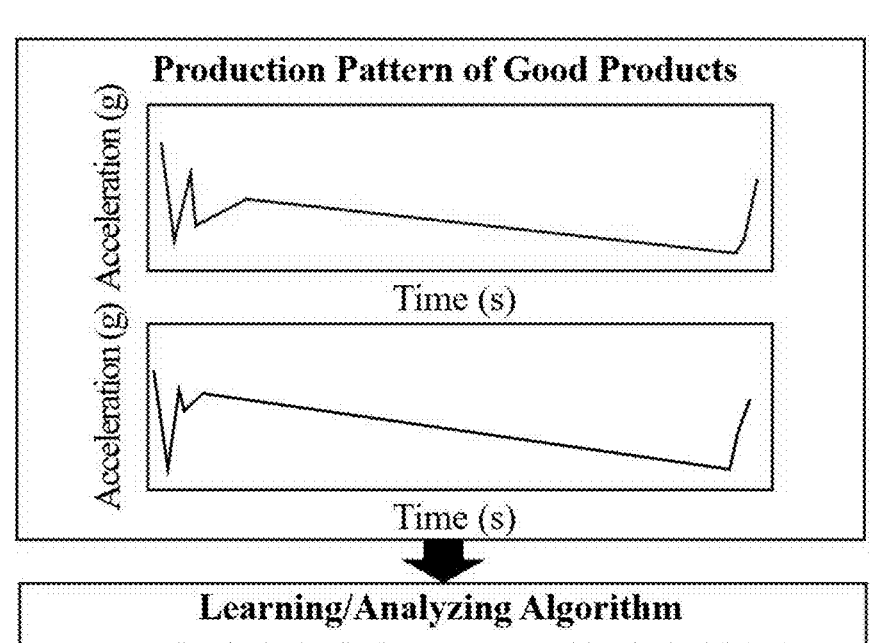
FIG. 16 shows using collected vibration signal data for quality analysis of molded products and analyzing whether it is a good product or a poor product by comparing the collected vibration signal data with measured vibration signal data.
Figure 16:
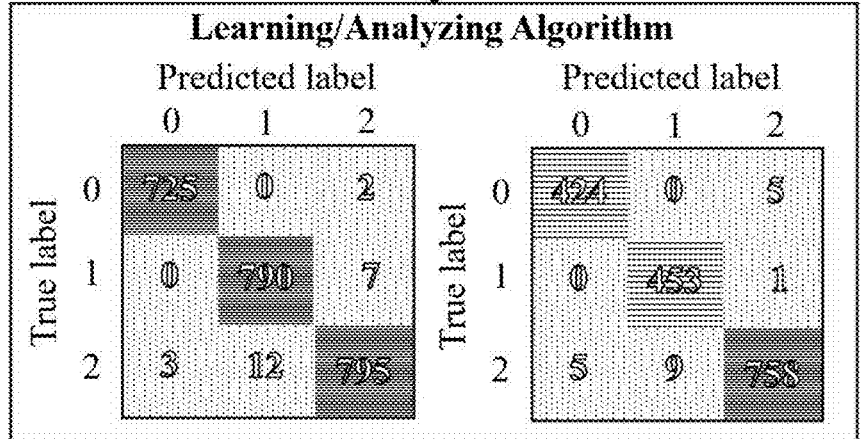

FIG. 16 schematically shows an AI/ML algorithm that learns whether it is a pattern enabling production of good products or is a production pattern with a defect or a possibility of a problem by distinguishing the distraction of vibration signal data measured by an acceleration sensor or a vibration sensor, and determines good products and defects on the basis of the learned pattern.

Even though there are the same product, the same material, and the same machine in product production of an injection molding process, various molding conditions in which good products can be produced exist.

An embodiment of the present disclosure can construct an algorithm that learns patterns of good products of various conditions of various molding conditions for production of good products and vibration signal data measured by an acceleration sensor or a vibration sensor according to the molding conditions in consideration of the fact that a molding condition for producing good molded products is not only one, and that determines whether it is a good product by comparing the pattern of the vibration signal data measured by the acceleration sensor and finally collected with the learned pattern with each other.

In this case, for learning of a pattern, it is possible to extract and learn a pattern on the basis of a regularized or normalized value and apply the pattern in order to determine whether it is a good product.

Figure 17:
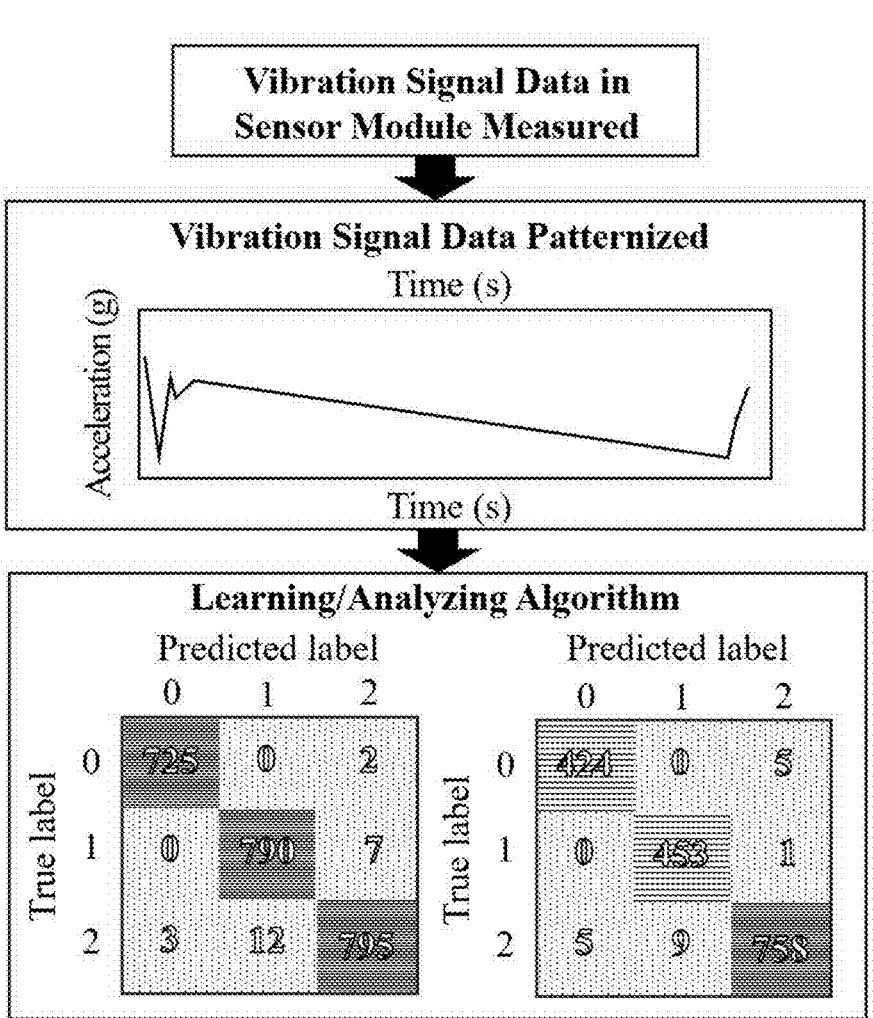
FIG. 17 schematically shows construction of an AI/ML algorithm that determines what kinds of defect have been generated in real time by labeling and learning vibration signal data information with a problem.

The algorithm constructed through the method of FIG. 16 is used to analyze vibration signal data measured by an acceleration sensor of a vibration sensor in real time, as in FIG. 17, and accordingly, it is possible to analyze whether production data collected in real time is a good product or a defect, and to use the analysis for analysis of a production rate, a defect rate, etc.

Figure 18:
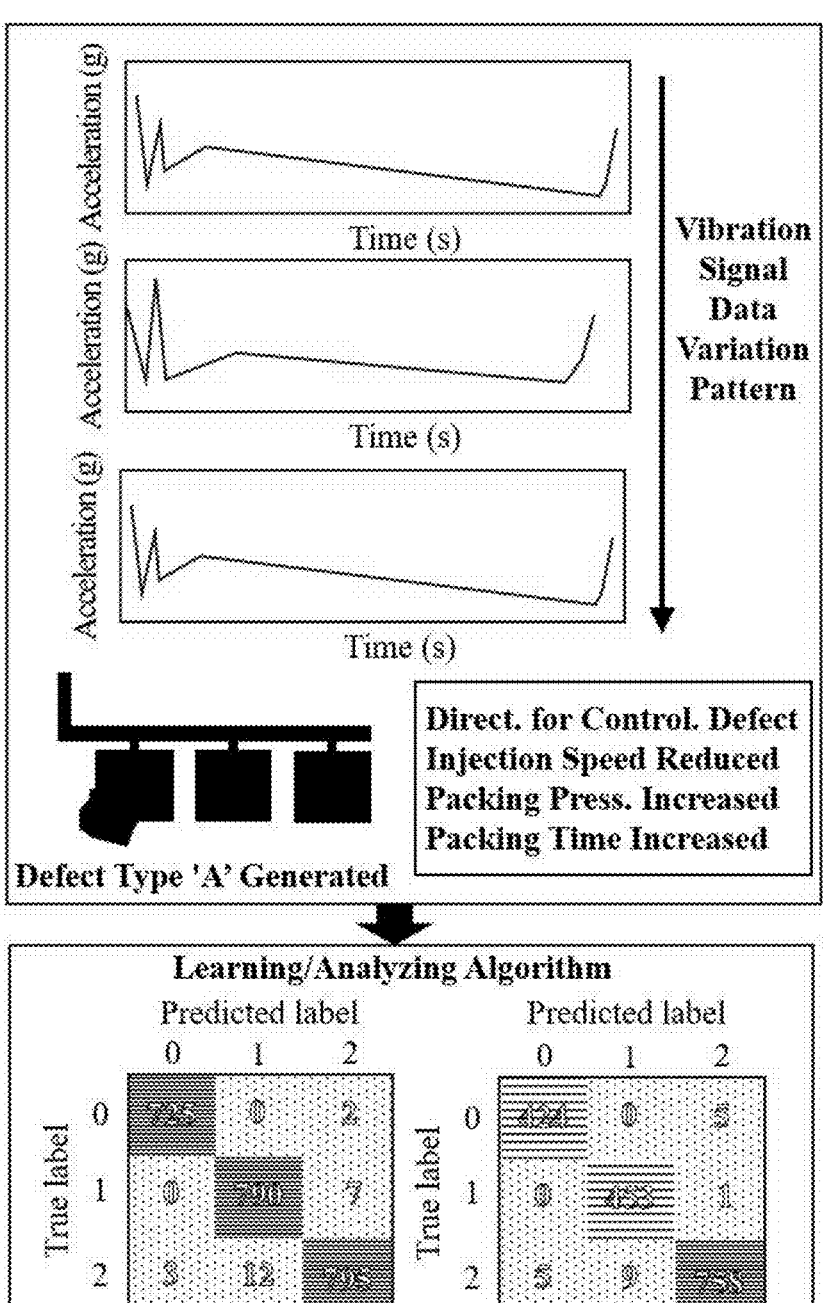
FIGS. 18 and 20 show a method of deriving a result by analyzing variation of collected vibration signal data using an AI/ML algorithm.
Figure 20:
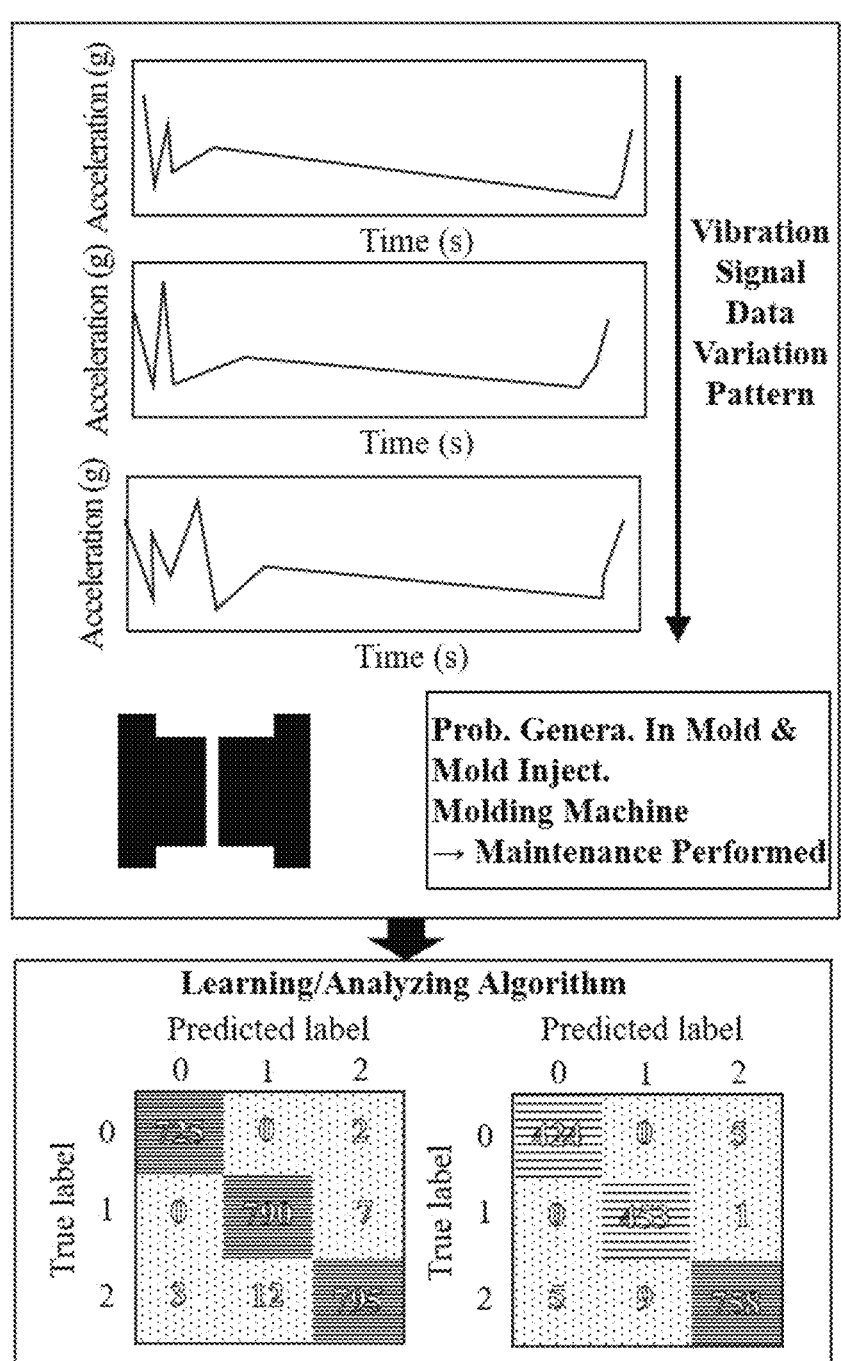

If the method of FIG. 16 is a method of deriving a result by analyzing distribution of the currently collected vibration signal data, the methods of FIG. 18 and FIG. 20 are methods of deriving a result by analyzing variation of collected vibration signal data.

Another embodiment of the present disclosure performs a process of controlling a process in which poor products are produced such that good products are produced by changing a molding condition at a site when a problem is generated while molded products are produced through injection molding, and poor products are produced. This series of processes are collected as information of vibration signals measured by the acceleration sensor or the vibration sensor disposed in the sensing device, and are shown as data variation patterns.

Another embodiment of the present disclosure can construct an AI/ML algorithm that determines what kinds of defects have been generated in real time by labeling defect information generated in the state in which, as in FIG. 18, the data of a vibration signal measured by an acceleration sensor or a vibration sensor is changed due to a problem generated in vibration signal data while good products are continuously produced, and then the state enabling good products to be produced is returned, the data of vibration signals is maintained again at a predetermined level, and work is performed.

Figure 19:
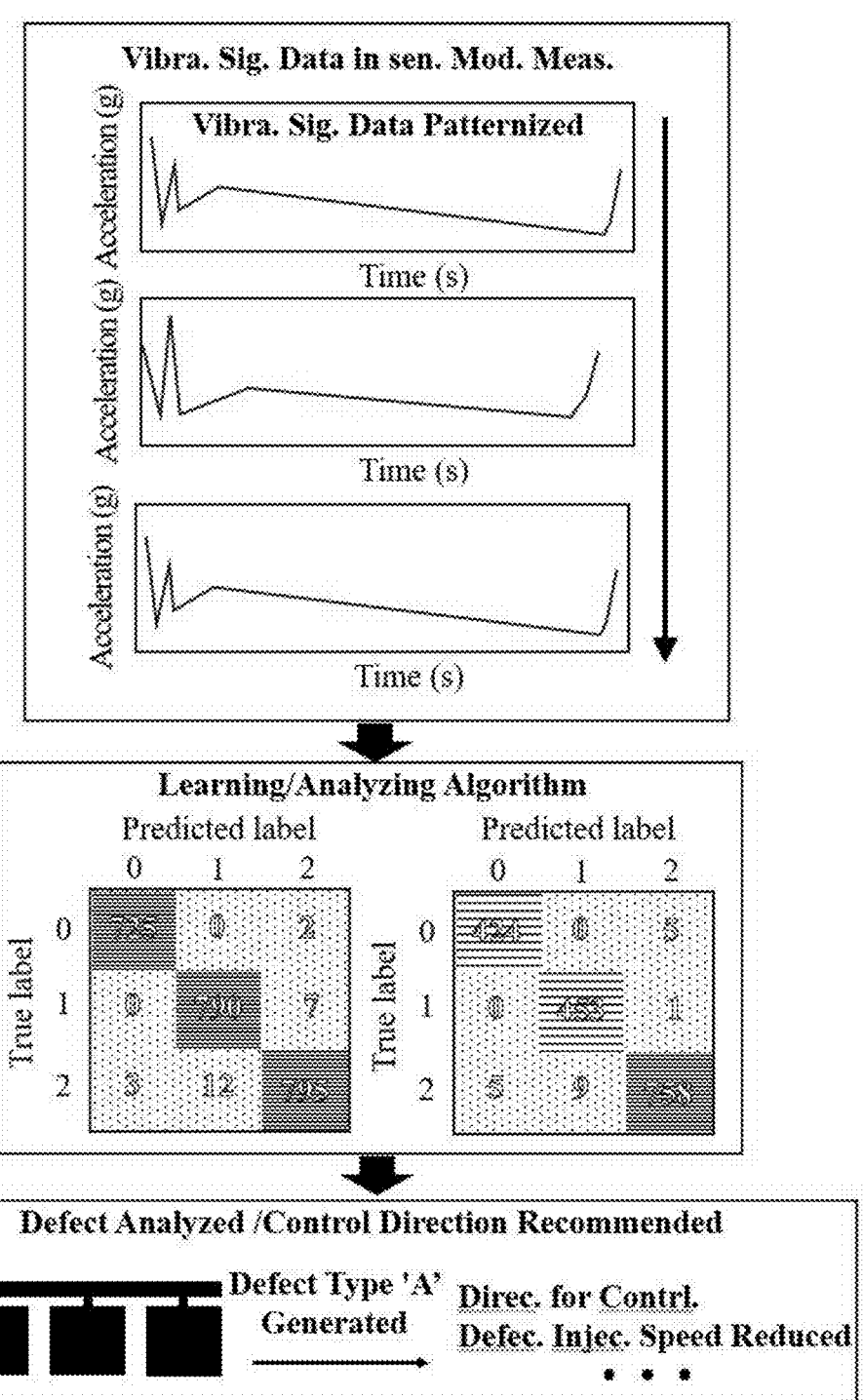
FIG. 19 is a view that shows analyzing whether it is a good product or a poor product by performing pattern recognition with vibration signal data obtained by an acceleration sensor or a vibration sensor in real time using an AI/ML algorithm.

It is possible to construct a recommendation algorithm about how to control the processor (e.g., increasing or decreasing the injection speed, increasing or decreasing the magnitude of packing pressure, and increasing or decreasing the packing time) through learning under various conditions on the basis of the constructed AI/ML algorithm when a defect is generated, as in FIG. 19.

The AI/ML algorithm constructed through the method of FIG. 18 can be used to analyze vibration signal data obtained by the acceleration sensor or the vibration sensor and collected in real time, as in FIG. 19, and can be configured to find out what defect has been generated and to recommend the control direction of the process for normal control or to directly control the process.

Production data collected in real time is also used to analyze a production rate, a defect rate, etc. by analyzing whether it is a good product or a poor product through the constructed AI/ML algorithm.

The method of FIG. 20 has the advantage that it is possible to prevent a problem by taking an appropriate measure before a problem is generated by constructing an AI/ML algorithm that learns patterns by labeling a variation pattern of data of vibration signals, which are measured by an acceleration sensor or a vibration sensor and collected in a method similar to that of FIG. 18, and the point in time for maintenance of a mold of an injection molding machine (generation of damage or a problem) or the kind of maintenance or a generated problem, and that determines the point in time for maintenance of the mold or the injection molding machine or a problem that may be generated by comparing the data variation pattern of the vibration signals measured by an acceleration sensor or a vibration sensor with the learned patterns in real time.

When a problem is generated in a mold, an injection molding machine, or the like in a product production process through injection molding, a problematic symptom is generated in products produced before. This phenomenon is applied also to vibration signal data measured by an acceleration sensor or a vibration sensor and collected in the sensing device and a vibration signal pattern different from the pattern when good products are produced is generated before a problem is generated.

Another embodiment of the present disclosure can construct an AI/ML algorithm that senses a problem in a mold, an injection molding machine, or the like in advance when a problem is generated in a vibration signal data by labeling and learning problems of the mold or the injection molding machine that may be and are actually generated.

Figure 21:
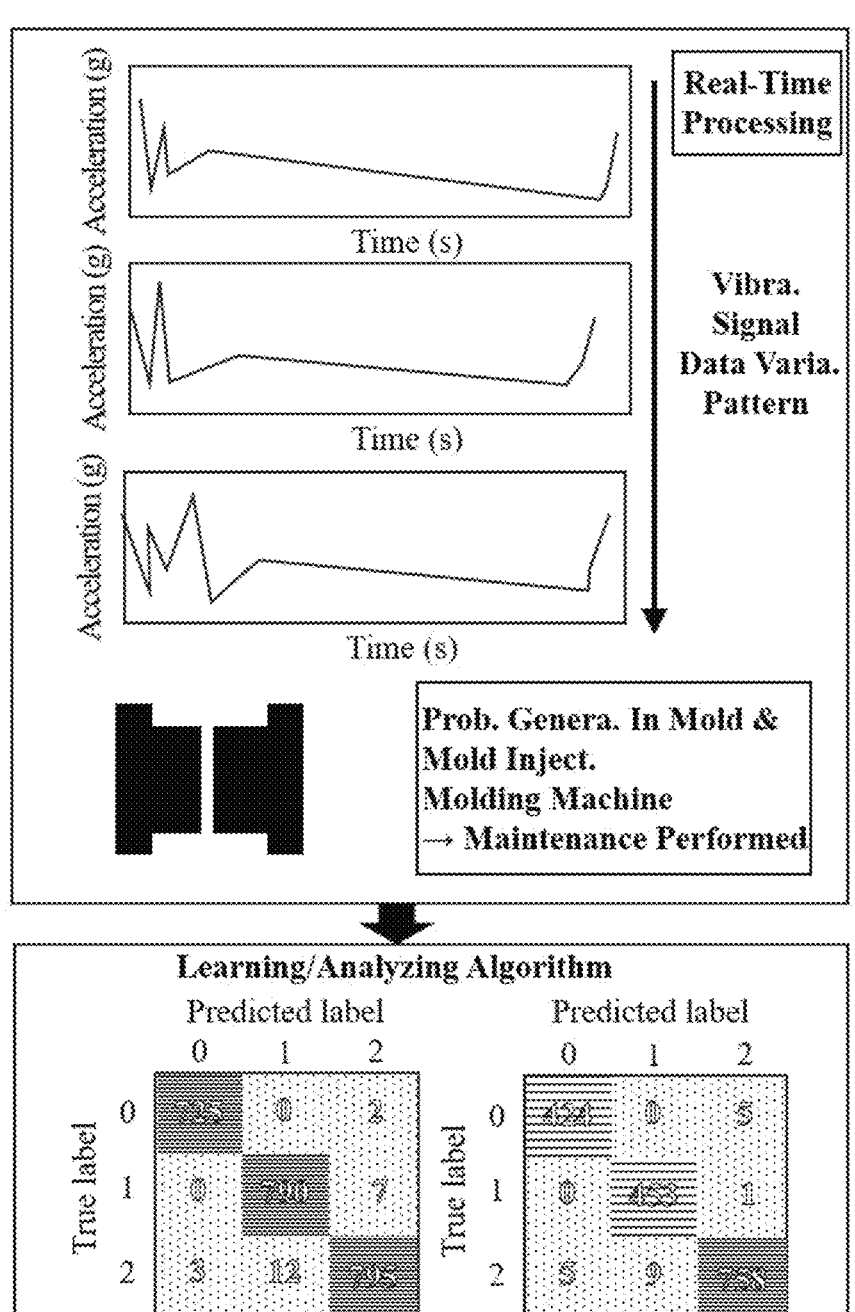
FIG. 21 shows a process of using vibration signal data measured by an acceleration sensor or a vibration sensor in real time in analysis by performing pattern recognition on the data through an AI/ML algorithm, and of predicting and determining a point in time for maintenance of a mold or a molding machine in real time.

The algorithm constructed through the method of FIG. 20 is used to analyze vibration signal data generated by an acceleration sensor or a vibration sensor and collected in real time, as in FIG. 21, and can predict and determine in real time the point in time for maintenance in advance through vibration signal data pattern variation measured by the acceleration sensor or the vibration sensor before a problem is generated in a mold or an injection molding machine, whereby it is possible to perform maintenance on the mold or the injection molding machine before an unexpected large loss cost is generated, and accordingly, it is possible to improve the production rate and reduce a loss cost.

The protective range of the present disclosure is described with reference to the above description.

The present disclosure analyzes and manages the quality of injection-molded products by counting shots by detecting opening and closing of a mold by fixedly installing a magnetic sensor at sides of a moving side and a fixed side of a mold, and by measuring at least one or more of temperature and a vibration signal through at least one or more of a temperature sensor and a sensor that are installed at a side of a mold to measure temperature of the mold and vibration of the mold, respectively.

As another embodiment of the present disclosure, a magnetic sensor is composed of a magnet unit installed at the moving side of a mold and a hall sensor installed at the fixed side of the mold, the sensor that measures vibration of a mold is an acceleration sensor or a vibration sensor, and the hall sensor, the sensor that measures vibration, and the temperature sensor are disposed in an sensor module.

As another embodiment of the present disclosure, a sensor module is installed at the fixed side of a mold, a controlling PCB and a measuring PCB are disposed in the sensor module, a hall sensor, a liquid crystal display, an MCU, and a memory equipped with a control algorithm are disposed on the controlling PCB and fixedly installed in a sensor module case, and the measuring PCB is equipped with a temperature sensor for accurately measuring temperature and vibration and a sensor that measures vibration and is installed in close contact with a sensor module bottom case.

As another embodiment of the present disclosure, temperature data measured by the temperature sensor installed on the measuring PCB divides a molded product production period into a preheating period, a cooling period, a producing period, and a non-producing period on the basis of a classification algorithm of the control algorithm mounted on the controlling PCB, and products that are produced in the preheating period, the cooling period, and the non-producing period are determined as poor products or molded products with a possibility of a problem and are determined to be excluded from the quantity of good products.

Another embodiment of the present disclosure is configured such that a case in which the temperature of a mold changes out of a set normal temperature occurs also in the producing period, and when the temperature departs from a set normal temperature range, a deviation is analyzed through comparison with the reference of data classified as a stable pattern, and when the deviation departs from the set range, products are determined as poor products or products with a possibility of problem, as products produced at abnormal temperature, and are excluded from the quantity of good products.

As another embodiment of the present disclosure, a vibration signal measured by an acceleration sensor or a vibration sensor at the point in time of end of packing or start of cooling depends on the difference between the magnitude of packing pressure and the magnitude of back pressure, and when the amplitude magnitude of a vibration signal departs from a set magnitude, it is determined that there is a problem with the quality of a molded product.

Another embodiment of the present disclosure is configured to count mold-opening signals and/or mold-closing signals from a vibration signal measured by an acceleration sensor or a vibration sensor, to determine whether the signal interval between the mold-opening signal and the mold-closing signal exists within a set time range by measuring the signal interval in real time, and to determine that there is a problem with the quality of a molded product when the signal interval is smaller or larger than the set time range as the result of determination.

Another embodiment of the present disclosure is configured to measure a time interval in real time for at least one of a mold-opening time and a mold-closing time measured by a hall sensor, and to determine that there is a problem with the quality of a molded product when at least one time of the mold-opening time and the mold-closing time departs from a set range of time interval.

As another embodiment of the present disclosure, a controller is fixedly installed in a sensor module, the controller controls time intervals for obtaining signals from an acceleration sensor or a vibration sensor, a temperature sensor, and a magnetic sensor, a wireless communication unit including Bluetooth is provided to transmit the signals, which are obtained from the hall sensor, the acceleration sensor or the vibration sensor, the temperature sensor, and the magnetic sensor, to at least one or more of a computer, a management server, a server, and a smartphone through a terminal from the controller after data is processed in accordance with a predetermined procedure by an algorithm mounted on the controller disposed in the sensor module, and the signals are transmitted to the whole world in real time through high-speed internet WiFi communication such that the quality of products can be managed.

Another embodiment of the present disclosure is configured to construct an AI/ML algorithm that determines what kinds of defects have been generated in real time by labeling and learning various pieces of defect information, to extract patterns on the basis of a value regularized or normalized for learning and use the patterns for learning, and to determine that it is a good product through comparison with patterns of vibration signal data measured by an acceleration sensor or a vibration sensor on the basis of the learned patterns.

Another embodiment of the present disclosure detects signals separately in periods of start of injection, switch of packing, and end of packing from a vibration signal of a mold to monitor an injection molding process, continuously measures the magnitude of the amplitude of vibration signals generated at the points in time of start of injection, switch of packing, and end of packing and at least one or more of times between the periods, and compares and analyzes the measured vibration signals and time data with each other, thereby being able to determine whether there is a problem with a molded product.

Another embodiment of the present disclosure may be configured to mount an AI/ML algorithm that senses a problematic state of a mold or an injection molding machine when a problem is generated in a mold vibration signal pattern, to compare and analyze patterns of measured vibration signals when a problem is generated and a poor product is produced while molded products are produced through injection molding by labeling and learning patterns for problems generated in various ways in a mold or an injection molding machine, and to change a molding condition such that at least one or more of increasing or decreasing an injection speed, increasing or decreasing the magnitude of packing pressure, and increasing or decreasing a packing time are performed to progress to a normal control process so that good products are produced in the process in which poor products are produced.

Another embodiment of the present disclosure may be configured to mount an AI/ML algorithm that senses a problematic state of a mold or an injection molding machine, to label problems that are generated in various ways in the mold or the injection molding machine and learn patterns, and to determine the point in time for maintenance of the mold or the injection molding machine or a method for solving problems that may be generated, through comparison with the labeled and learned patterns on the basis of variation patterns of vibration signal data measured by an acceleration sensor or a vibration sensor.

Another embodiment of the present disclosure may be configured to learn good product production patterns of various molding conditions for producing good products and various conditions of vibration signal data measured by an acceleration sensor or a vibration sensor in consideration of the fact that a molding condition for producing good molded products is not only one because even though there are the same product, the same material, and the same machine in product production of an injection molding process, various molding conditions in which good products can be produced exist, and to determine whether it is a good product by comparing the patterns of the vibration signal data measured and finally collected by the acceleration sensor with the learned patterns.

According to another embodiment of the present disclosure, since the magnitude of the magnetism of a magnet installed in a magnet unit decreases in inverse proportion to the cube of a distance, the magnet unit and a sensor module having a hall sensor disposed therein are fixedly installed within a set distance, it is disposed on a controlling PCB and fixedly installed at an upper portion in the sensor module, a magnet installed in the magnet unit is fixedly installed at an upper portion of the magnet unit at a predetermined distance from a mold surface due to a property that magnetic flux density decreases at high temperature.

According to another embodiment of the present disclosure, a battery supplying electrical energy to electronic parts disposed in the sensor module is fixedly installed on a battery-fixing member positioned between a measuring PCB and a controlling PCB, a silicon member for fixing the battery is fixedly installed over the battery such that the battery is not separated from the battery-fixing member, and an insulating plate is fixedly installed under the battery-fixing member to prevent a use temperature limit of the battery from being exceeded by minimizing heat transferring to the battery.

The protective range described in the specification of the present disclosure can be protected as the right of invention by describing the protective range by various combination ways of components on the basis of the above description.

INDUSTRIAL APPLICABILITY

The present disclosure relates to a system for analyzing and monitoring the quality of injection-molded products, the system counting the number of injection-molded molds by attaching and installing magnetic sensors to a moving side and a fixed side, the system measuring whether temperature of a mold is maintained within a set range by measuring the temperature in real time by installing a temperature sensor on the mold for management of the quality of a product in molding, and the system measuring and analyzing in real time the amplitude and generation interval of vibration signals that are generated by pressure of resin that is injected into the mold by fixedly installing an acceleration sensor or a vibration sensor on the mold, whereby it is possible to easily manage the quality of molded products and increase reliability. Accordingly, the industrial applicability is very high.

DESCRIPTION OF REFERENCE NUMERALS

100: sensing module 101: sensor module top case
102: button for operating sensor module
103: cover of liquid crystal display for displaying sensor module information
104: silicon cover of button for operating sensor module
105: PCB for controlling sensor module
106: silicon member for fixing sensor module battery
107: sensor module battery 108: battery-fixing member
109: PCB for measuring sensor module 110: insulating plate
111: button for checking installation of sensor module 112: cover of button for checking installation of sensor module
113: sensor module bottom case 114: button for operating sensor module
115: liquid crystal display for displaying sensor module information
116: operating process (MCU) of controlling PCB
117: haul sensor 118: acceleration sensor
119: temperature sensor 120: button for checking installation of sensor module
150: sensing device 200: magnet unit
201: magnet unit body 202: magnet unit cover
203: magnet 204: magnet accommodation groove
300: mold
400: mold temperature measured by contact-type temperature measurer
500: mold temperature measured by sensing device
600: data transmission/reception terminal
700: server/cloud system
801: non-producing period based on mold temperature analysis
802: preheating period based on mold temperature
803: producing period based on mold temperature
804: cooling period based on mold temperature
805: good product-possible period of producing period
806: period with possibility of defect or problem of producing period

22

The invention claimed is:

1. A system for analyzing and monitoring the quality of injection-molded products to monitor management of the injection-molded products, wherein the system:
counts shots by detecting opening and closing of a mold by fixedly installing a magnetic sensor at sides of a moving side and a fixed side of the mold, and
monitors management of injection-molded products by measuring at least one or more of temperature and a vibration signal through at least one or more of a temperature sensor and a sensor that are installed at a side of the mold to measure temperature of the mold and vibration of the mold, respectively, wherein:
a sensor module is installed at the fixed side of the mold,
a controlling printed circuit board (PCB) and a measuring PCB are disposed in the sensor module,
a hall sensor, a liquid crystal display, an MCU, and a memory equipped with a control algorithm are mounted on the controlling PCB and fixedly installed at an upper portion in a sensor module case, and
the measuring PCB is equipped with the temperature sensor and the sensor measuring vibration and is installed in close contact with a sensor module bottom case to accurately measure temperature and vibration.

2. The system of claim 1, wherein:
the magnetic sensor is composed of a magnet unit installed at the moving side of the mold and the hall sensor installed at the fixed side of the mold,
the sensor measuring vibration of the mold is an acceleration sensor or a vibration sensor, and
the hall sensor, the sensor measuring vibration, and the temperature sensor are disposed in the sensor module.

3. The system of claim 2, wherein:
temperature data measured by the temperature sensor installed on the measuring PCB divides a molded product production period into a preheating period, a cooling period, producing period, and a non-producing period on the basis of a classification algorithm of the control algorithm mounted on the controlling PCB, and
products produced in the preheating period, the cooling period, and the non-producing period are determined as poor products or molded products with a possibility of a problem and are determined to be excluded from the quantity of good products.

4. The system of claim 3, wherein:
a case in which temperature of the mold changes out of a set normal temperature range occurs also in the producing period, and
when temperature departs from the set normal temperature range, a deviation is analyzed through comparison with a reference of data classified as a stable pattern, and when the deviation departs from the set range, products are determined as poor products or products with a possibility of problem, as products produced at abnormal temperature, and are excluded from the quantity of good products.

5. The system of claim 2, wherein a vibration signal measured by the acceleration sensor or the vibration sensor at a point in time of end of packing or start of cooling depends on a difference between a magnitude of packing pressure and a magnitude of back pressure, and when an amplitude magnitude of a vibration signal departs from a set magnitude, it is determined that there is a problem with the quality of a molded product.

6. The system of claim 2, wherein:

mold-opening signals and/or mold-closing signals are counted from a vibration signal measured by the acceleration sensor or the vibration sensor, whether a signal interval between the mold-opening signal and the mold-closing signal exists within a set time range is determined by measuring the signal interval in real time, and it is determined that there is a problem with the quality of a molded product when the signal interval is smaller or larger than the set time range as the result of determination.

7. The system of claim 2, wherein:

a time interval is measured in real time for at least one or more of a mold-opening time and a mold-closing time measured by the hall sensor, and it is determined that there is a problem with the quality of a molded product when at least one or more times of the mold-opening time and the mold-closing time depart from a set range of time interval.

8. The system of claim 2, wherein:

a controller is fixedly installed in the sensor module, the controller controls time intervals for obtaining signals from the acceleration sensor or the vibration sensor, the temperature sensor, and the magnetic sensor, a wireless communication unit including Bluetooth is provided to transmit the signals, which are obtained from the hall sensor, the acceleration sensor or the vibration sensor, the temperature sensor, and the magnetic sensor, to at least one or more of a computer, a management server, a server, and a smartphone through a terminal from the controller after data is processed in accordance with a predetermined procedure by an algorithm mounted on the controller disposed in the sensor module, and the signals are transmitted to the whole world in real time through high-speed internet WiFi communication such that the quality of products can be managed.

9. The system of claim 2, wherein:

an AI/ML algorithm that determines what kinds of defects have been generated in real time by labeling various pieces of defect information is constructed, patterns are extracted on the basis of a value regularized or normalized for learning and are learned, and whether it is a good product is determined through comparison with patterns of vibration signal data measured by the acceleration sensor or the vibration sensor on the basis of the learned patterns.

10. The system of claim 2, wherein:

signals are detected separately in periods of start of injection, switch of packing, and end of packing from a vibration signal of the mold to monitor an injection molding process, and a magnitude of an amplitude of vibration signals generated at the points in time of start of injection, switch of packing, and end of packing and at least one or more of times between the periods are continuously measured, and the measured vibration signals and time data are compared and analyzed with each other, thereby determining whether there is a problem with a molded product.

11. The system of claim 2, wherein:

an AI/ML algorithm that senses a problematic state of a mold or an injection molding machine when a problem is generated in a mold vibration signal pattern is mounted, and patterns of measured vibration signals and learned signal pattern are compared and analyzed when a problem is generated and a poor product is produced while injection-molded products are produced by labeling and learning patterns for problems generated in various ways in a mold or an injection molding machine, and a molding condition is changed such that at least one or more of increasing or decreasing an injection speed, increasing or decreasing the magnitude of packing pressure, and increasing or decreasing a packing time are performed to progress to a normal control process so that good products are produced in a process in which poor products are produced.

12. The system of claim 2, wherein:

an AI/ML algorithm that senses a problematic state of a mold or an injection molding machine is mounted, and a point in time for maintenance of the mold or the injection molding machine or problems that may be generated are determined by labeling and learning patterns for problems that are generated in various ways in the mold or the injection molding machine, and by comparing the labeled and learned patterns on the basis of variation patterns of vibration signal data measured and collected in real time by the acceleration sensor or the vibration sensor when a problem is generated in advance in a vibration signal data pattern.

13. The system of claim 2, wherein:

even though there are the same product, the same material, and the same machine in product production of an injection molding process, various molding conditions in which good products can be produced exist, good product production patterns of various molding conditions for producing good products and various conditions of vibration signal data measured by the acceleration sensor or the vibration sensor are learned in consideration of a fact that a molding condition for producing good molded products is not only one, and whether it is a good product is determined by comparing the patterns of the vibration signal data measured and finally collected by the acceleration sensor with the learned patterns.

14. The system of claim 2, wherein:

intensity of magnetism of a magnet installed in the magnet unit decreases in inverse proportion to a cube of a distance, so the magnet unit and the sensor module having the haul sensor therein are fixedly installed within a set distance, the hall sensor is disposed on the controlling PCB and fixedly installed at an upper portion in the sensor module, and the magnet installed in the magnet unit is fixedly installed at an upper portion of the magnet unit at a predetermined distance from a mold surface due to a property that magnetic flux density decreases at high temperature.

15. The system of claim 2, wherein:

a battery for supplying electrical energy to electronic parts disposed in the sensor module is fixedly installed on a battery-fixing member positioned between the measuring PCB and the controlling PCB, a silicon member for fixing the battery is fixedly installed over the battery such that the battery is not separated from the battery-fixing member, and an insulating plate is fixedly installed under the battery-fixing member to prevent a use temperature limit of the battery from being exceeded by minimizing heat transferring to the battery.

16. The system of claim 1, wherein:

the liquid crystal display for displaying sensor module information is fixedly installed in a sensor module top case, and the liquid crystal display for displaying sensor module information is configured to be able to display one of the final number of shots, a mold-closing state, a battery level, communication sensitivity between a terminal and a controller, an installation state, and whether there is stored data by operating a button for operating the sensor module.

17. The system of claim 1, further comprising a button for checking installation of the sensor module fixedly installed on the sensor module bottom case and installed toward a mold surface to be able to check installation of the sensor module on the mold surface or sense separation of the sensor module from the mold.

18. The system of claim 1, wherein:

temperature data measured by the temperature sensor installed on the measuring PCB divides a molded product production period into a preheating period, a cooling period, producing period, and a non-producing period on the basis of a classification algorithm of the control algorithm mounted on the controlling PCB, and products produced in the preheating period, the cooling period, and the non-producing period are determined as poor products or molded products with a possibility of a problem and are determined to be excluded from the quantity of good products.

19. The system of claim 18, wherein:

a case in which temperature of the mold changes out of a set normal temperature range occurs also in the producing period, and when temperature departs from the set normal temperature range, a deviation is analyzed through comparison with a reference of data classified as a stable pattern, and when the deviation departs from the set range, products are determined as poor products or products with a possibility of problem, as products produced at abnormal temperature, and are excluded from the quantity of good products.

* * * * *